US012579013B2

(12) United States Patent
An et al.

(10) Patent No.: US 12,579,013 B2
(45) Date of Patent: Mar. 17, 2026

(54) COMMAND PROCESSING DEVICE AND DISPLAY DRIVING INTEGRATED CIRCUIT INCLUDING THE SAME

(71) Applicant: SAMSUNG ELECTRONICS CO., LTD., Suwon-si (KR)

(72) Inventors: Hyowon An, Suwon-si (KR); Junyoung Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 18/749,085

(22) Filed: Jun. 20, 2024

(65) Prior Publication Data

US 2025/0147819 A1     May 8, 2025

(30) Foreign Application Priority Data

Nov. 3, 2023    (KR) ........................ 10-2023-0150447

(51) Int. Cl.
*G06F 9/54* (2006.01)
*G06F 3/14* (2006.01)
*G06F 3/147* (2006.01)

(52) U.S. Cl.
CPC .............. *G06F 9/54* (2013.01); *G06F 3/1407* (2013.01); *G06F 3/147* (2013.01); *G06F 2209/543* (2013.01)

(58) Field of Classification Search
None
See application file for complete search history.

(56) References Cited

U.S. PATENT DOCUMENTS

| | | | | |
|---|---|---|---|---|
| 6,970,966 B2 * | 11/2005 | Gemelli | .................. | G06F 30/30 |
| | | | | 710/305 |
| 8,493,397 B1 * | 7/2013 | Su | .......................... | H04N 19/61 |
| | | | | 345/530 |
| 8,866,828 B2 * | 10/2014 | Sun | .......................... | G06T 1/00 |
| | | | | 345/157 |
| 9,111,368 B1 * | 8/2015 | Karandikar | .......... | H04N 19/436 |
| 9,633,624 B2 | 4/2017 | Ju et al. | | |
| 9,805,687 B2 | 10/2017 | Han | | |

(Continued)

FOREIGN PATENT DOCUMENTS

| | | |
|---|---|---|
| KR | 20180078705 | 7/2018 |
| KR | 1995623 | 7/2019 |
| KR | 2250493 | 5/2021 |

*Primary Examiner* — Fred Tzeng
(74) *Attorney, Agent, or Firm* — Fish & Richardson P.C.

(57) ABSTRACT

A command processing device includes an asynchronous first-in first-out (FIFO) unit, a mode configuration unit and a post processing unit. The asynchronous FIFO unit receives a plurality of commands from an external device, and stores the plurality of commands. The mode configuration unit sets a command processing scheme for each of the plurality of commands to one of a first processing scheme or a second processing scheme different from the first processing scheme and stores the command processing scheme for each of the plurality of commands. The post processing unit determines the command processing scheme for each of the plurality of commands based on the mode configuration unit, and generates a plurality of control signals by processing the plurality of commands based on an input sequence of the plurality of commands and the determined command processing scheme.

20 Claims, 23 Drawing Sheets

(56)  References Cited

U.S. PATENT DOCUMENTS

| | | | | |
|---|---|---|---|---|
| 10,382,808 B2 * | 8/2019 | Sirpal | .................... | G06F 3/048 |
| 10,394,361 B2 | 8/2019 | Park | | |
| 10,497,303 B2 | 12/2019 | Li et al. | | |
| 11,996,161 B2 * | 5/2024 | Kim | .................... | G11C 7/1057 |
| 2005/0174364 A1 * | 8/2005 | Malmstrom | .............. | G06F 3/14 |
| | | | | 345/522 |
| 2007/0174544 A1 * | 7/2007 | Yasuda | ................. | G06F 3/0689 |
| | | | | 711/112 |
| 2008/0250350 A1 * | 10/2008 | Chen | ......................... | G06F 3/02 |
| | | | | 715/810 |
| 2014/0372839 A1 * | 12/2014 | Ok | ...................... | G06F 11/1004 |
| | | | | 714/807 |
| 2016/0188481 A1 * | 6/2016 | Miller | .................... | G06F 12/00 |
| | | | | 711/118 |
| 2016/0274923 A1 | 9/2016 | Harriman | | |
| 2017/0017357 A1 * | 1/2017 | Hohl | .................... | G06F 3/0482 |
| 2017/0064368 A1 * | 3/2017 | Yu | ...................... | G06F 3/04883 |
| 2017/0205986 A1 * | 7/2017 | Sun | ...................... | G06F 3/0482 |
| 2021/0389895 A1 * | 12/2021 | Pekny | .................. | G06F 3/0659 |
| 2022/0100521 A1 * | 3/2022 | Zhang | .................. | G06F 9/3814 |
| 2023/0040656 A1 | 2/2023 | Wai et al. | | |
| 2024/0221800 A1 * | 7/2024 | Kim | .................... | G11C 7/1084 |
| 2024/0370263 A1 * | 11/2024 | Venu | .................. | G06F 9/30072 |

* cited by examiner

| COMMAND ID | MODE SETTING VALUE |
|------------|--------------------|
| ID1 | 0 |
| ID2 | 1 |
| ⋮ | ⋮ |

| COMMAND ID | MODE SETTING VALUE | ACCESS SETTING VALUE |
|:---:|:---:|:---:|
| ID1 | 0 | 0 |
| ID2 | 1 | 0 |
| ID3 | 0 | 1 |
| ⋮ | ⋮ | ⋮ |

FIG. 13A

| COMMAND ID | MODE SETTING VALUE |
|---|---|
| ID1 | 0 |
| ID2 | 1 |
| ⋮ | ⋮ |
| ID4 | – |
| ⋮ | ⋮ |

FIG. 13B

| COMMAND ID | MODE SETTING VALUE | ACCESS SETTING VALUE |
|---|---|---|
| ID1 | 0 | 0 |
| ID2 | 1 | 0 |
| ID3 | 0 | 1 |
| ID4 | – | – |
| ⋮ | ⋮ | ⋮ |

FIG. 16A

| Command | Hex Code | Description |
|---|---|---|
| read_DDB_continue | A8h | Continue reading the DDB from the last read location |
| read_DDB_start | A1h | Read the DDB from the provided location |
| read_memory_continue | 3Eh | Read image data from the peripheral continuing after the last read_memory_continue or read_memory_start |
| read_memory_start | 2Eh | Transfer image data from the peripheral to the Host Processor interface starting at the location provided by set_column_address and set_page_address |
| read_PPS_continue | A9h | Continue reading the specified length of PPS data immediately following the last read location |
| read_PPS_start | A2h | Transfer the specified length of PPS data starting at the beginning of the PPS register |
| ... | ... | ... |

FIG. 16B

| Command | Hex Code | Description |
|---|---|---|
| write_control_display | 53h | Writes control mode of display brightness |
| write_LUT | 2Dh | Fills the peripheral look-up table with the provided data |
| write_memory_continue | 3Ch | Transfer image information from the Host Processor interface to the peripheral from the last written location |
| write_memory_start | 2Ch | Transfer image data from the Host Processor to the peripheral starting at the location provided by set_column_address and set_page_address |
| write_power_save | 55h | Writes power save mode |
| ... | ... | ... |

<u>PXa</u>

<u>PXb</u>

960 — DISPLAY PANEL

940

950 — DISPLAY DRIVING INTEGRATED CIRCUIT

CMD_PRC

910

920 — HOST PROCESSOR

1

COMMAND PROCESSING DEVICE AND DISPLAY DRIVING INTEGRATED CIRCUIT INCLUDING THE SAME

CROSS-REFERENCE TO RELATED APPLICATION

This application claims priority under 35 USC § 119 to Korean Patent Application No. 10-2023-0150447 filed on Nov. 3, 2023, in the Korean Intellectual Property Office (KIPO), the contents of which are herein incorporated by reference in their entirety.

BACKGROUND

Generally, a mobile device such as a smartphone is equipped with various functions suitable for high-end products. For example, to provide multimedia functions such as a digital camera function to the mobile device, a higher resolution is desired for a display device used in the mobile device. Further, with the increase in image resolution, data traffic between an application processor (AP) and a display driving (or driver) integrated circuit (DDIC) has rapidly increased. Power consumed in the AP and/or the DDIC has also gradually increased.

SUMMARY

At least one example of the present disclosure provides a command processing device capable of selectively, adaptively and/or dynamically processing commands depending on types of the commands.

At least one example of the present disclosure provides a display driving integrated circuit including the command processing device.

According to examples, a command processing device includes an asynchronous first-in first-out (FIFO) unit, a mode configuration unit and a post processing unit. The asynchronous FIFO unit receives a plurality of commands from an external device, and stores the plurality of commands. The mode configuration unit sets a command processing scheme for each of the plurality of commands to one of a first processing scheme or a second processing scheme different from the first processing scheme, and stores the command processing scheme for each of the plurality of commands. The post processing unit determines the command processing scheme for each of the plurality of commands based on the mode configuration unit, and generates a plurality of control signals by processing the plurality of commands based on an input sequence of the plurality of commands and the determined command processing scheme.

According to examples, a display driving integrated circuit includes a command processing device and a display driving device. The command processing device generates a plurality of control signals based on a plurality of commands that are received from an external device. The display driving device drives a display panel based on the plurality of control signals. The command processing device includes an asynchronous first-in first-out (FIFO) unit, a mode configuration unit and a post processing unit. The asynchronous FIFO unit receives the plurality of commands from the external device, and stores the plurality of commands. The mode configuration unit sets a command processing scheme for each of the plurality of commands to one of a first processing scheme or a second processing scheme different from the first processing scheme, and stores the command processing scheme for each of the plurality of commands. The post processing unit determines the command processing scheme for each of the plurality of commands based on the mode configuration unit, and generates the plurality of control signals by processing the plurality of commands based on an input sequence of the plurality of commands and the determined command processing scheme.

According to examples, a command processing device includes an asynchronous first-in first-out (FIFO) unit, a mode configuration unit, a control unit, a first processing unit and a second processing unit. The asynchronous FIFO unit receives a plurality of commands and a plurality of data from an external device, and separately stores the plurality of commands and the plurality of data. The mode configuration unit sets a command processing scheme for each of the plurality of commands to one of a first processing scheme or a second processing scheme different from the first processing scheme, sets an access scheme for each of the plurality of commands to one of a first access scheme or a second access scheme different from the first access scheme, and stores a plurality of setting values each of which represents one of the first and second processing schemes and one of the first and second access schemes. The control unit determines the command processing scheme for each of the plurality of commands and the access scheme for each of the plurality of commands based on a plurality of command identifications (IDs) included in the plurality of commands and the plurality of setting values. The first processing unit generates a first transaction by processing the first command based on the first processing scheme when a command processing scheme for a first command among the plurality of commands is determined to be the first processing scheme. The second processing unit generates a first interrupt by processing the first command based on the second processing scheme when the command processing scheme for the first command is determined to be the second processing scheme. When the command processing scheme for the first command is determined to be the first processing scheme and an access scheme for the first command is determined to be the second access scheme, the first interrupt is additionally generated using the second processing unit. The first processing scheme is a fixed command processing scheme that is performed depending on a structure of a plurality of logic circuits included in the first processing unit. The second processing scheme is a changeable command processing scheme that is performed by executing program codes stored in a memory by a microcontroller unit (MCU) included in the second processing unit.

In the command processing device and the display driving integrated circuit according to examples, a hybrid processing scheme may be applied, employed and adopted in which the command processing scheme is selectively, adaptively and/or dynamically determined as at least one of the hardware scheme or the software scheme depending on types of commands. For example, a dedicated hardware may be designed or implemented to process specific commands based on the hardware scheme, and thus the fast command processing speed and the requirements for the command response speed may be ensured or satisfied. For example, an additional path may be implemented to process specific commands in the software scheme, and thus the change in operations of the specific commands may be easily performed. In addition, to maintain and/or obtain the flexibility, a configurable hardware may be implemented based on a memory-mapped system. Accordingly, the advantages of the hardware and software schemes may be strengthened, the disadvantages of the hardware and software schemes may be ameliorated, and thus the command processing may be efficiently performed.

BRIEF DESCRIPTION OF THE DRAWINGS

Illustrative, non-limiting example implementations will be more clearly understood from the following detailed description taken in conjunction with the accompanying drawings.

FIGS. 13A, 13B and 13C are diagrams for describing an operation of a post processing unit of FIG. 4.

FIGS. 16A and 16B are diagrams for describing an operation of a command processing device according to example implementations.

FIG. 21 is a block diagram illustrating a display system according to example implementations.

DETAILED DESCRIPTION

Figure 1:
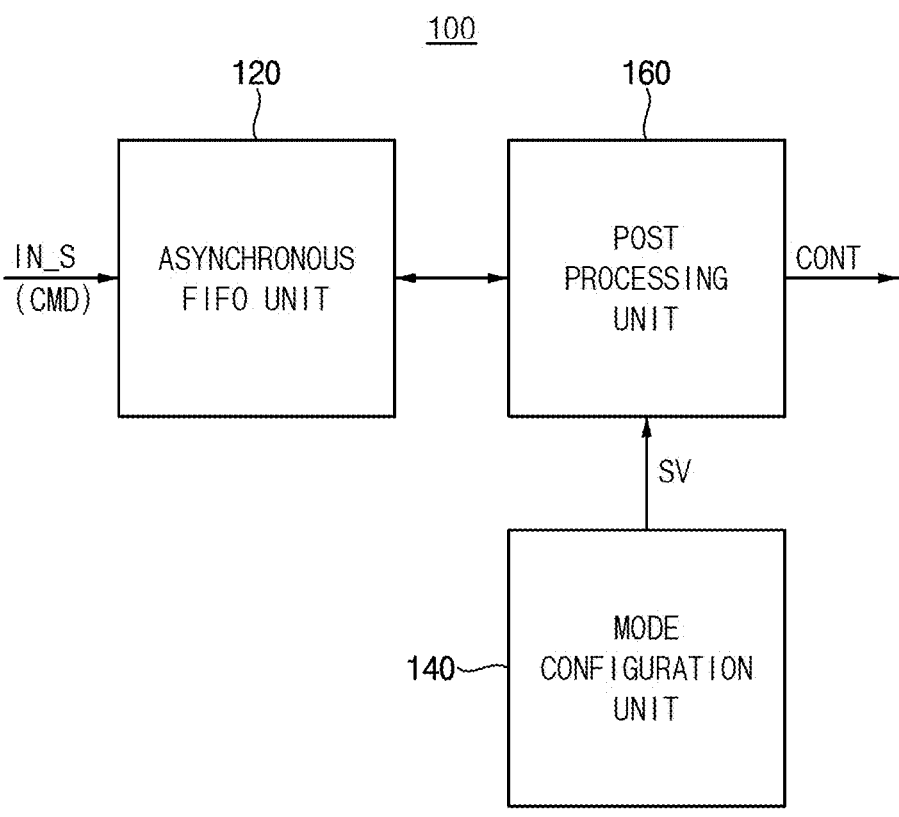
FIG. 1 is a block diagram illustrating a command processing device according to example implementations.

Various examples will be described more fully with reference to the accompanying drawings, in which implementations are shown. The present disclosure may, however, be embodied in many different forms and should not be construed as limited to the implementations set forth herein. Like reference numerals refer to like elements throughout this application.

FIG. 1 is a block diagram illustrating a command processing device according to example implementations.

Referring to FIG. 1, a command processing device 100 includes an asynchronous first-in first-out (FIFO) unit 120, a mode configuration unit 140 and a post processing unit 160.

In some examples, the command processing device 100 may be included in a display device and a display driving integrated circuit included therein and may operate as a receiver that receives and processes signals provided from a host processor to drive the display device. Examples of the display driving integrated circuit and the display device will be described with reference to FIGS. 17, 18A, 18B, 19, 20A and 20B. Examples of a system including the host processor and the display device will be described with reference to FIGS. 21 and 22.

The asynchronous FIFO unit 120 receives a plurality of signals IN_S from an external device or from the outside (e.g., from a host processor 920 in FIG. 21), and stores the plurality of signals IN_S. For example, the plurality of signals IN_S includes a plurality of commands CMD, and the asynchronous FIFO unit 120 receives the plurality of commands CMD from the external device and stores the plurality of commands CMD. For example, although not illustrated in FIG. 1, the plurality of signals IN_S may further include a plurality of data, and the asynchronous FIFO unit 120 may receive and store the plurality of data. An example of the asynchronous FIFO unit 120 will be described with reference to FIG. 2.

In some example implementations, the command processing device 100 may operate based on a mobile industry processor interface (MIPI) standard. In other words, the host processor and the display device (e.g., the display driving integrated circuit included in the display device) may exchange signals based on the MIPI standard (e.g., based on a display serial interface (DSI) standard). For example, the plurality of signals IN_S received by the command processing device 100 included in the display device (e.g., the display driving integrated circuit) may be signals implemented based on the MIPI standard.

In some example implementations, when the plurality of signals IN_S are signals implemented based on the MIPI standard, the plurality of commands CMD included in the plurality of signals IN_S may be MIPI display command set (DCS) commands. For example, the command processing device 100 may be referred to as a MIPI DCS command processing device.

The DSI is a specification by the MIPI alliance aimed at reducing the cost of display controllers in a mobile device. The DSI is commonly targeted at liquid crystal display (LCD) and similar display technologies, and it defines a serial bus and a communication protocol between a host which is the source of image data and the device which is the destination. At the physical layer, the DSI specifies a high-speed differential signaling point-to-point serial bus. This bus includes one high speed clock lane and one or more data lanes. The communication protocol describes two sets of instructions. The DCS is a set of common commands for controlling the display device, and the manufacturer command set (MCS) is a device-specific command space whose definition is up to the device manufacturer. The format of the DCS is specified by the DSI standard, and the DCS defines registers that can be addressed and what their operation is. The MCS often includes commands required to program a nonvolatile memory, set specific device registers (such as gamma correction), or perform other actions not described in the DSI standard.

The mode configuration unit 140 sets a command processing scheme for each of the plurality of commands CMD to one of a first processing scheme (or first processing mode) or a second processing scheme (or second processing mode) different from the first processing scheme, and stores the command processing scheme for each of the plurality of commands. For example, it may be preset or set in advance how to process, handle or treat each of various types of commands that can be received by the command processing device 100, and the preset command processing scheme for each of various types of commands may be stored as a plurality of setting values SV in the mode configuration unit 140. An example of the mode configuration unit 140 will be described with reference to FIG. 3.

The post processing unit 160 determines the command processing scheme for each of the plurality of commands CMD, which are received from the external device and stored in the asynchronous FIFO unit 120, based on the mode configuration unit 140, e.g., based on the plurality of setting values SV provided from the mode configuration unit 140. The post processing unit 160 generates a plurality of control signals CONT by processing the plurality of commands CMD based on an input sequence (or order) of the plurality of commands CMD and the determined command processing scheme. For example, commands received first may be processed first, and commands received later may be processed later. For example, the type (or form) of each control signal corresponding to each command may be determined depending on the command processing scheme.

In some example implementations, the first processing scheme may be a command processing scheme that is fixed, unchangeable and predetermined depending on an internal structure of the post processing unit 160, and the second processing scheme may be a command processing scheme that is flexible, changeable and irrelevant to (or independent of) the internal structure of the post processing unit 160. As will be described with reference to FIG. 4, the first processing scheme may be based on a hardware configuration within the post processing unit 160 and may be referred to as a hardware scheme (or hardware mode), and the second processing scheme may be based on software execution and may be referred to as a software scheme (or software mode).

In some example implementations, as will be described with reference to FIGS. 6, 7A, 7B and 7C, one of the first processing scheme and the second processing scheme may be selected and determined as a command processing scheme for a specific command, and a specific control signal may be generated by processing the specific command based on the selected and/or determined one of the first processing scheme and the second processing scheme.

In some example implementations, as will be described with reference to FIGS. 8, 9A and 9B, when a predetermined condition is satisfied, both the first processing scheme and the second processing scheme may be selected and determined as a command processing scheme for a specific command, and a specific control signal may be generated by processing the specific command based on both the first processing scheme and the second processing scheme.

In a conventional command processing device, a command processing scheme for all possible commands is implemented only in a hardware scheme or a software scheme. If the command processing scheme is implemented only in the hardware scheme, the command processing speed may be relatively fast, however, there may be problems in that operations of all commands should be accurately defined at the chip design stage and the chip should be re-designed when an operation of a specific command is to be changed. If the command processing scheme is implemented only in the software scheme, it may flexibly respond to a change in an operation of a specific command, however, there may be problems in that the command processing speed is relatively slow and the number and/or sequence of command transmission should be restricted to satisfy the requirements for the command response speed.

In the command processing device 100 according to example implementations, a hybrid processing scheme may be applied, employed and adopted in which the command processing scheme is selectively, adaptively and/or dynamically determined as at least one of the hardware scheme and the software scheme depending on types of commands. For example, a dedicated hardware may be designed or implemented to process specific commands based on the hardware scheme, and thus the fast command processing speed and the requirements for the command response speed may be ensured or satisfied. For example, an additional path may be implemented to process specific commands in the software scheme, and thus the change in operations of the specific commands may be easily performed. In addition, to maintain and/or obtain the flexibility, a configurable hardware may be implemented based on a memory-mapped system. Accordingly, the advantages of the hardware and software schemes may be strengthened, the disadvantages of the hardware and software schemes may be ameliorated, and thus the command processing may be efficiently performed.

Figure 2:
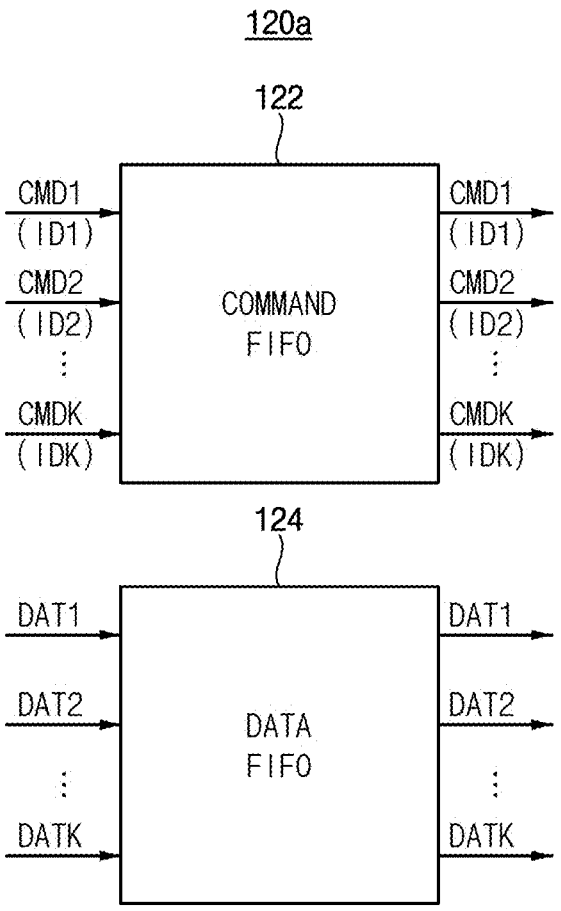
FIG. 2 is a block diagram illustrating an example of an asynchronous FIFO unit included in a command processing device of FIG. 1.

FIG. 2 is a block diagram illustrating an example of an asynchronous FIFO unit included in a command processing device of FIG. 1.

Referring to FIG. 2, an asynchronous FIFO unit 120a may include a command FIFO 122 and a data FIFO 124.

The command FIFO 122 may sequentially receive a plurality of commands CMD1, CMD2, . . . , CMDK (where K is a positive integer greater than or equal to two), and may sequentially output the plurality of commands CMD1, CMD2, . . . , CMDK based on a sequence or order of receiving the commands CMD1, CMD2, . . . , CMDK. For example, all of the plurality of commands CMD1, CMD2, . . . , CMDK may be different types of commands. For another example, at least some of the plurality of commands CMD1, CMD2, . . . , CMDK may be the same type of commands.

The plurality of commands CMD1, CMD2, . . . , CMDK may include a plurality of command identifications (IDs) ID1, ID2, . . . , IDK for identifying and/or checking the types of commands. For example, the first command CMD1 may include the first command ID ID1, the second command CMD2 may include the second command ID ID2, and the K-th command CMDK may include the K-th command ID IDK.

The data FIFO 124 may sequentially receive a plurality of data DAT1, DAT2, . . . , DATK corresponding to the plurality of commands CMD1, CMD2, . . . , CMDK, and may sequentially output the plurality of data DAT1, DAT2, . . . , DATK based on a sequence or order of receiving the data DAT1, DAT2, . . . , DATK.

As described above, the asynchronous FIFO unit 120a may store the commands CMD1, CMD2, . . . , CMDK and the data DAT1, DAT2, . . . , DATK separately, and thus the asynchronous FIFO unit 120a may include two FIFO units (e.g., the command FIFO 122 and the data FIFO 124) that are implemented separately, independently and/or individually. However, example implementations are not limited thereto, and the number of FIFO units included in the command processing device 100 may be variously determined according to example implementations.

Figure 3:
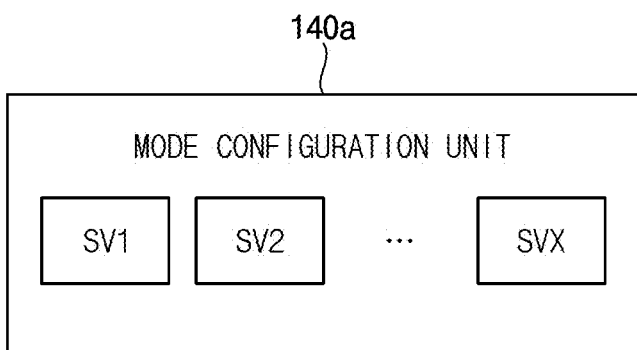
FIG. 3 is a block diagram illustrating an example of a mode configuration unit included in a command processing device of FIG. 1.

FIG. 3 is a block diagram illustrating an example of a mode configuration unit included in a command processing device of FIG. 1.

Referring to FIG. 3, a mode configuration unit 140a may store a plurality of setting values SV1, SV2, . . . , SVX (where X is a positive integer greater than or equal to two) representing or indicating command processing schemes for all types of commands that can be received by the command processing device 100. For example, the first setting value SV1 may represent a command processing scheme for a first type of command, the second setting value SV2 may represent a command processing scheme for a second type of command, and the X-th setting value SVX may represent a command processing scheme for an X-th type of command. In other words, when the number or quantity of the setting values SV1, SV2, . . . , SVX stored in the mode configuration unit 140a is X, the number or quantity of types of commands that can be received by the command processing device 100 may be X.

In some example implementations, the mode configuration unit 140a may include at least one register for storing the plurality of setting values SV1, SV2, . . . , SVX. For example, the mode configuration unit 140a may be implemented in the form of a special function register (SFR).

In some example implementations, a command processing scheme for each of the plurality of commands CMD1, CMD2, . . . CMDK may be determined based on the plurality of command IDs ID1, ID2, . . . , IDK in FIG. 2 and the plurality of setting values SV1, SV2, . . . , SVX in FIG. 3. For example, when the first command CMD1 is the first type of command, the first setting value SV1 representing the command processing scheme for the first type of command may be obtained based on the first command ID ID1 of the first command CMD1, and a command processing scheme for the first command CMD1 may be determined based on the first setting value SV1.

In some example implementations, command processing schemes for different types of commands may be determined based on different setting values, and command processing schemes for the same type of commands may be determined based on the same setting value. For example, when the first command CMD1 is the first type of command and the second command CMD2 is the second type of command different from the first type of command, the command processing scheme for the first command CMD1 and a command processing scheme for the second command CMD2 may be determined based on the first setting value SV1 and the second setting value SV2, respectively (e.g., based on different setting values). For example, when both the first command CMD1 and the second command CMD2 are the first type of command (e.g., the same type of commands), the command processing scheme for the first command CMD1 and a command processing scheme for the second command CMD2 may be determined based on the first setting value SV1 (e.g., based on the same setting value).

In some example implementations, the number of the setting values SV1, SV2, . . . , SVX stored in the mode configuration unit 140a may be changeable. For example, when a new command that does previously exist is to be defined and used, a new setting value for the new command may be additionally stored in the mode configuration unit 140a, and thus the number of the setting values may increase. For example, when an existing command that has been previously used is not to be used anymore, an existing setting values for the existing command may be deleted or removed from the mode configuration unit 140a, and thus the number of the setting values may decrease.

Figure 4:
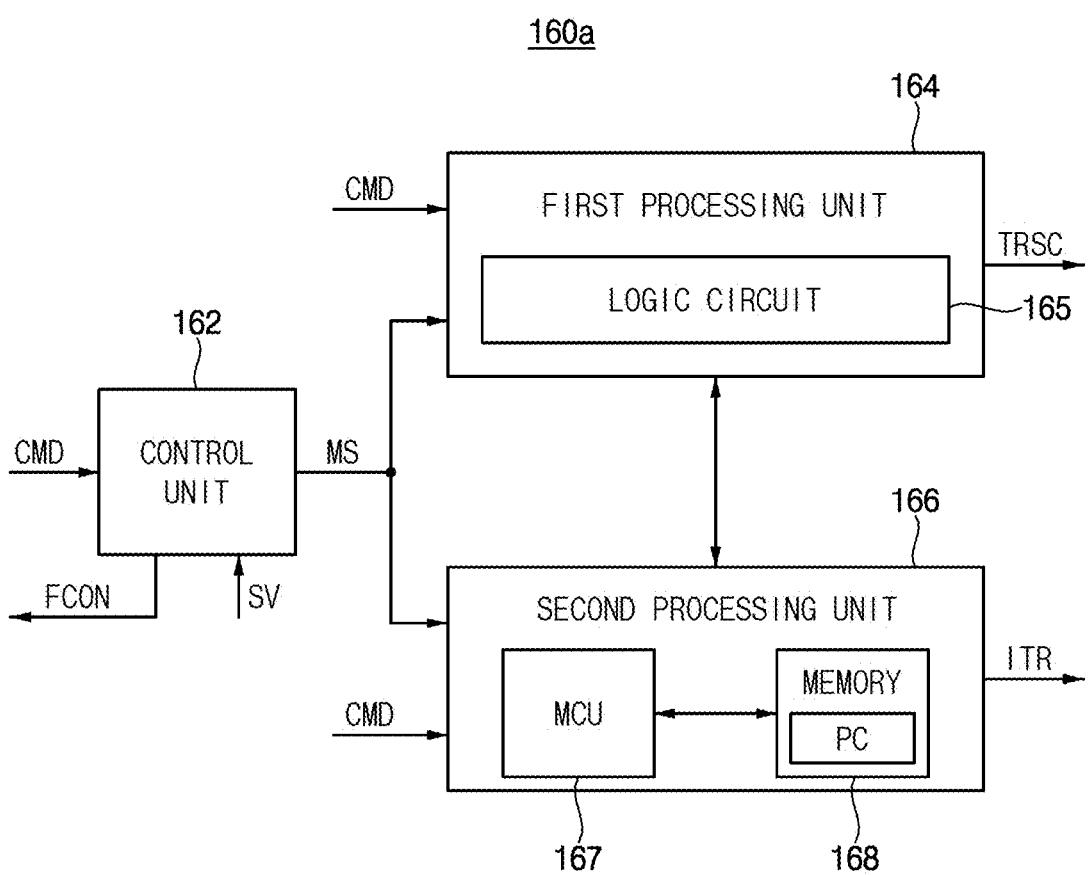
FIG. 4 is a block diagram illustrating an example of a post processing unit included in a command processing device of FIG. 1.

FIG. 4 is a block diagram illustrating an example of a post processing unit included in a command processing device of FIG. 1.

Referring to FIG. 4, a post processing unit 160a may include a control unit 162, a first processing unit 164 and a second processing unit 166.

The control unit 162 may sequentially receive the plurality of commands CMD stored in the asynchronous FIFO unit 120 based on the input sequence of the plurality of commands CMD, may receive the plurality of setting values SV from the mode configuration unit 140 based on the plurality of command IDs ID1, ID2, . . . , IDK included in the plurality of commands CMD, may determine the command processing schemes for the plurality of commands CMD based on the plurality of setting values SV, and may generate a mode signal MS representing the command processing schemes for the plurality of commands CMD. For example, when a specific command is received, a specific setting value corresponding to a type of the specific command may be obtained based on a command ID of the specific command, and a command processing scheme for the specific command may be determined based on the specific setting value.

The first processing unit 164 may generate a plurality of transactions TRSC by processing the plurality of commands CMD based on the first processing scheme (e.g., hardware scheme). For example, when the command processing scheme for the specific command is determined to be the first processing scheme, a specific transaction corresponding to the specific command may be generated by processing the specific command based on the first processing scheme, and the specific transaction may be output as a control signal corresponding to the specific command.

The first processing unit 164 may include a plurality of logic circuits 165 as hardware. The plurality of logic circuits 165 may be designed, arranged, connected and manufactured as predetermined by designer and manufacturer, and may be implemented to generate transactions by processing commands based on a predetermined scheme. For example, the plurality of logic circuits 165 may be implemented with a predetermined finite state machine (FSM). Thus, the first processing scheme performed by the first processing unit 164 may be fixed, unchangeable and predetermined depending on a structure or configuration of the plurality of logic circuits 165.

The second processing unit 166 may generate a plurality of interrupts ITR by processing the plurality of commands CMD based on the second processing scheme (e.g., software scheme). For example, when the command processing scheme for the specific command is determined to be the second processing scheme, a specific interrupt corresponding to the specific command may be generated by processing the specific command based on the second processing scheme, and the specific interrupt may be output as a control signal corresponding to the specific command.

The second processing unit 166 may include program codes (or instructions) PC as software. For example, the second processing unit 166 may include a microcontroller unit (MCU) 167 and a memory 168. For example, the program codes PC may be stored in the memory 168 and may be loaded and executed by the MCU 167. For example, the second processing unit 166 may be implemented to generate interrupts by flexibly processing commands based on the execution of the program codes PC. Thus, the second processing scheme performed by the second processing unit 166 may be flexible, configurable, and independent of the fixed configuration of the plurality of logic circuits 165.

In some example implementations, when the command processing scheme for the specific command is determined to be the first processing scheme, or after, the control unit 162 may further determine an access scheme for the specific command. For example, it may be additionally determined whether the access scheme for the specific command is a first access scheme or a second access scheme different from the first access scheme. For example, the first access scheme may be a direct access scheme in which command processing and corresponding data access are substantially simultaneously or concurrently performed. For example, the second access scheme may be an indirect access scheme in which data access is performed after a certain period of time has elapsed after command processing. For example, when the access scheme for the specific command is determined to be the second access scheme, the transaction generating operation using the first processing unit 164 and the interrupt generating operation using the second processing unit 166 may be performed together.

In some example implementations, the control unit 162 may further check or determine whether the plurality of commands CMD are valid. For example, only after it has been checked that the specific command is valid, may the operation of determining the command processing scheme, the operation of determining the access scheme and the command processing operation be performed on the specific command.

In some example implementations, the control unit 162 may generate a FIFO control signal FCON for controlling the asynchronous FIFO unit 120 depending on a result of the command processing operation and/or a result of checking the validity of command.

Figure 5:
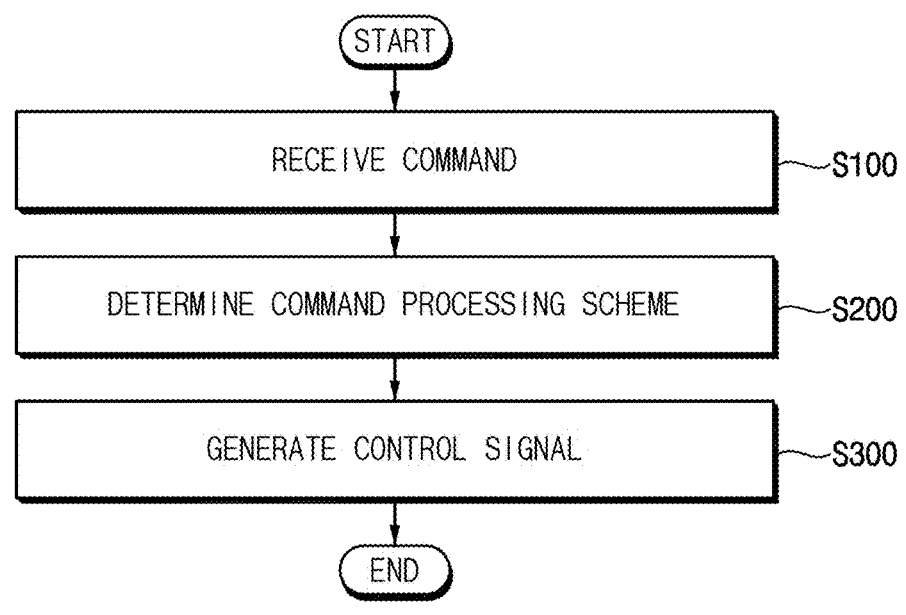
FIG. 5 is a flowchart illustrating a method of processing a command according to example implementations.

FIG. 5 is a flowchart illustrating a method of processing a command according to example implementations.

Referring to FIG. 5, in a method of processing a command according to example implementations, a plurality of commands is received from an external device (operation S100). The plurality of received commands may be internally stored. In addition, a command processing scheme for each of the plurality of commands may be preset to one of a first processing scheme or a second processing scheme are different from the first processing scheme, and a plurality of setting values each of which represents the command processing scheme for each of the plurality of commands may also be internally stored.

The command processing scheme for each of the plurality of commands is determined based on the plurality of setting values (operation S200), and a plurality of control signals are generated by processing the plurality of commands based on an input sequence of the plurality of commands and the determined command processing scheme (operation S300).

The method of processing the command according to example implementations may be performed by the command processing device 100 according to example implementations described with reference to FIG. 1. For example, operation S100 may be performed by the asynchronous FIFO unit 120 in FIG. 1, operation S200 may be performed by the mode configuration unit 140 and the post processing unit 160 in FIG. 1, and operation S300 may be performed by the post processing unit 160 in FIG. 1.

Figure 6:
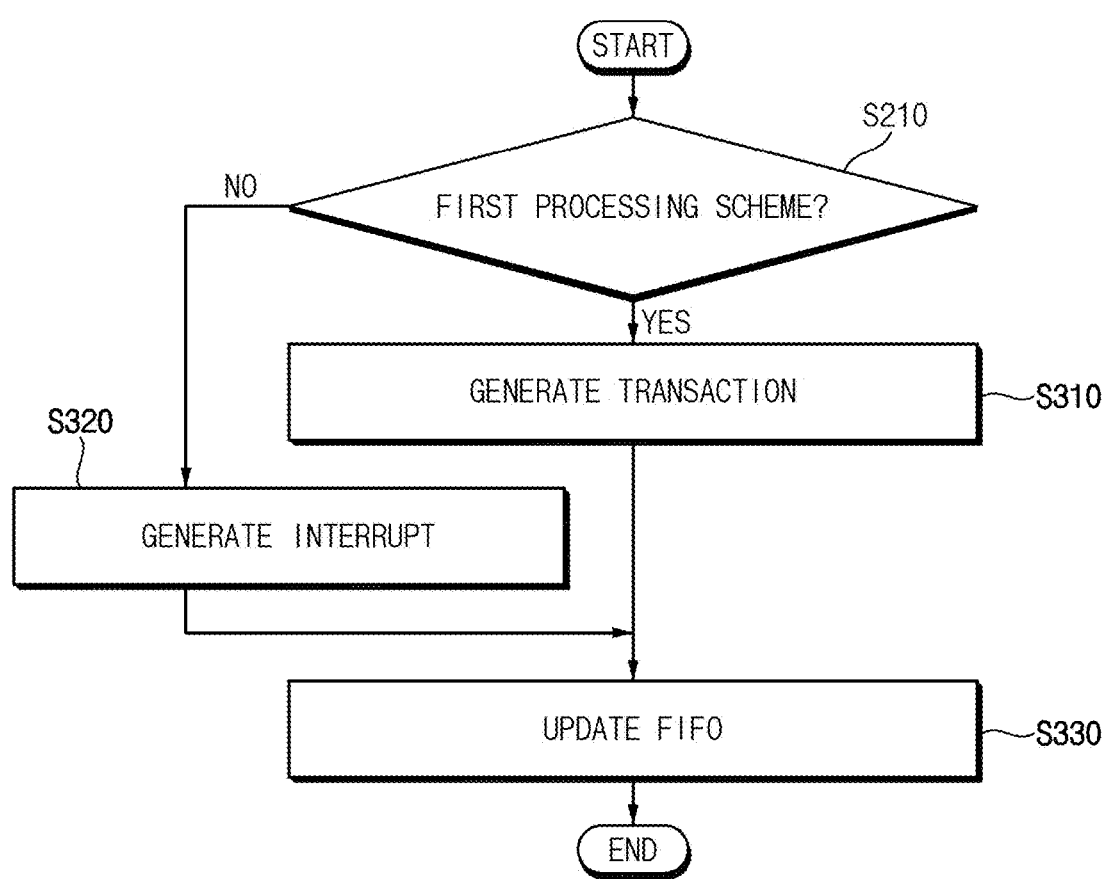
FIG. 6 is a flowchart illustrating an example of determining a command processing scheme and an example of generating a control signal in FIG. 5.

FIG. 6 is a flowchart illustrating an example of determining a command processing scheme and an example of generating a control signal in FIG. 5.

Referring to FIG. 6, an example where a command processing scheme for one command is determined and one control signal is generated by processing one command is illustrated.

For example, it may be determined whether a command processing scheme for a specific command is the first processing scheme or the second processing scheme (operation S210). For example, a specific setting value corresponding to a type of the specific command may be obtained based on a command ID of the specific command, and the command processing scheme for the specific command may be determined based on the specific setting value. For example, operation S210 may be included in operation S200 in FIG. 5. For example, operation S210 may be performed by the mode configuration unit 140*a* of FIG. 3 and the control unit 162 in FIG. 4.

When the command processing scheme for the specific command is determined to be the first processing scheme (operation S210: YES), a specific transaction may be generated by processing the specific command based on the first processing scheme (operation S310), and the specific transaction may be output as a control signal corresponding to the specific command. For example, target information (e.g., direction, byte mode, length, etc.) of the specific command may be checked or identified, and an advanced microcontroller bus architecture (AMBA) transaction may be generated. For example, operation S310 may be included in operation S300 in FIG. 5. For example, operation S310 may be performed by the first processing unit 164 in FIG. 4.

When the command processing scheme for the specific command is determined to be the second processing scheme (operation S210: NO), a specific interrupt corresponding to the specific command may be generated by processing the specific command based on the second processing scheme (operation S320), and the specific interrupt may be output as a control signal corresponding to the specific command. For example, a command interrupt may be generated, a command and corresponding data may be read from the command FIFO and the data FIFO, a software designed command processing may be performed, and an interrupt service routine (ISR) writing may be completed. For example, operation S320 may be included in operation S300 in FIG. 5. For example, operation S320 may be performed by the second processing unit 166 in FIG. 4.

After the specific command is processed by operation S310 or operation S320, (e.g., after the specific transaction or the specific interrupt is generated) the asynchronous FIFO unit 120 may be updated to delete the specific command (operation S330). For example, the command that has been processed may be deleted from the asynchronous FIFO unit 120 based on the FIFO control signal FCON generated from the control unit 162. For example, operation S330 may be included in operation S300 in FIG. 5.

Figures 7A, 7B:
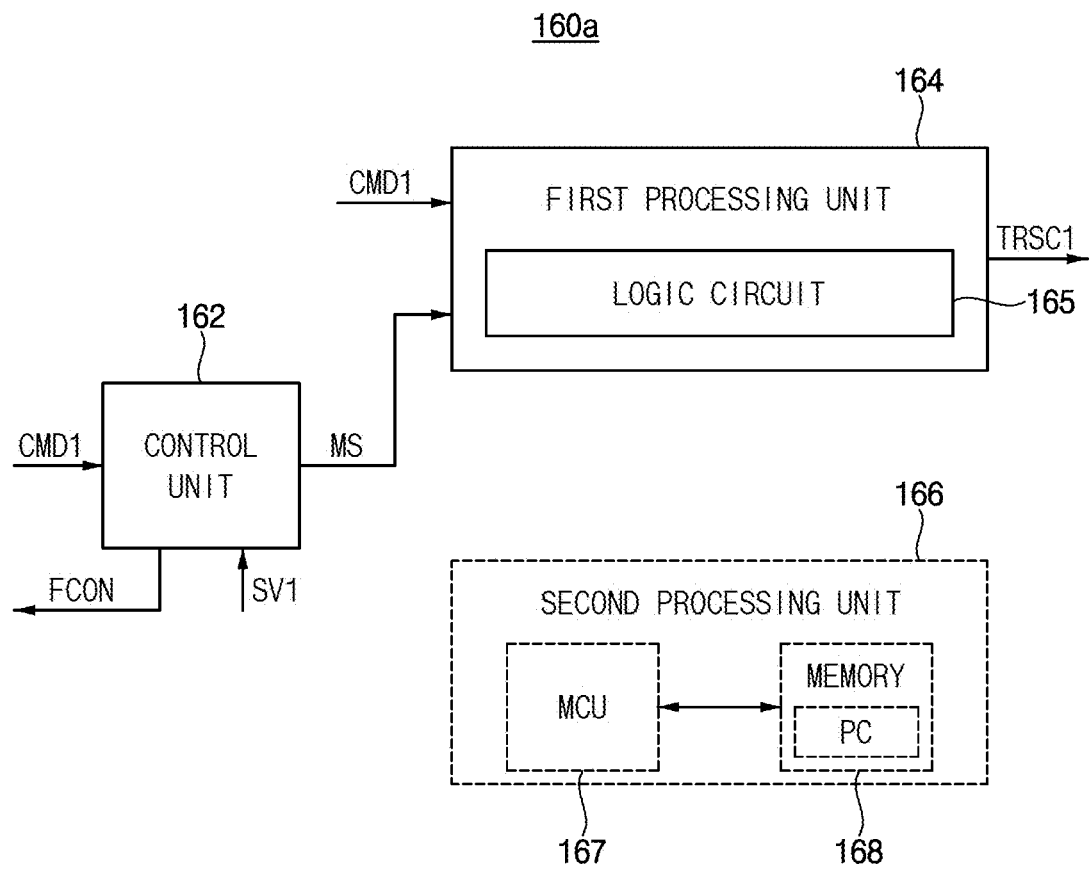
FIGS. 7A, 7B and 7C are diagrams for describing an operation of a post processing unit of FIG. 4.
Figure 7C:
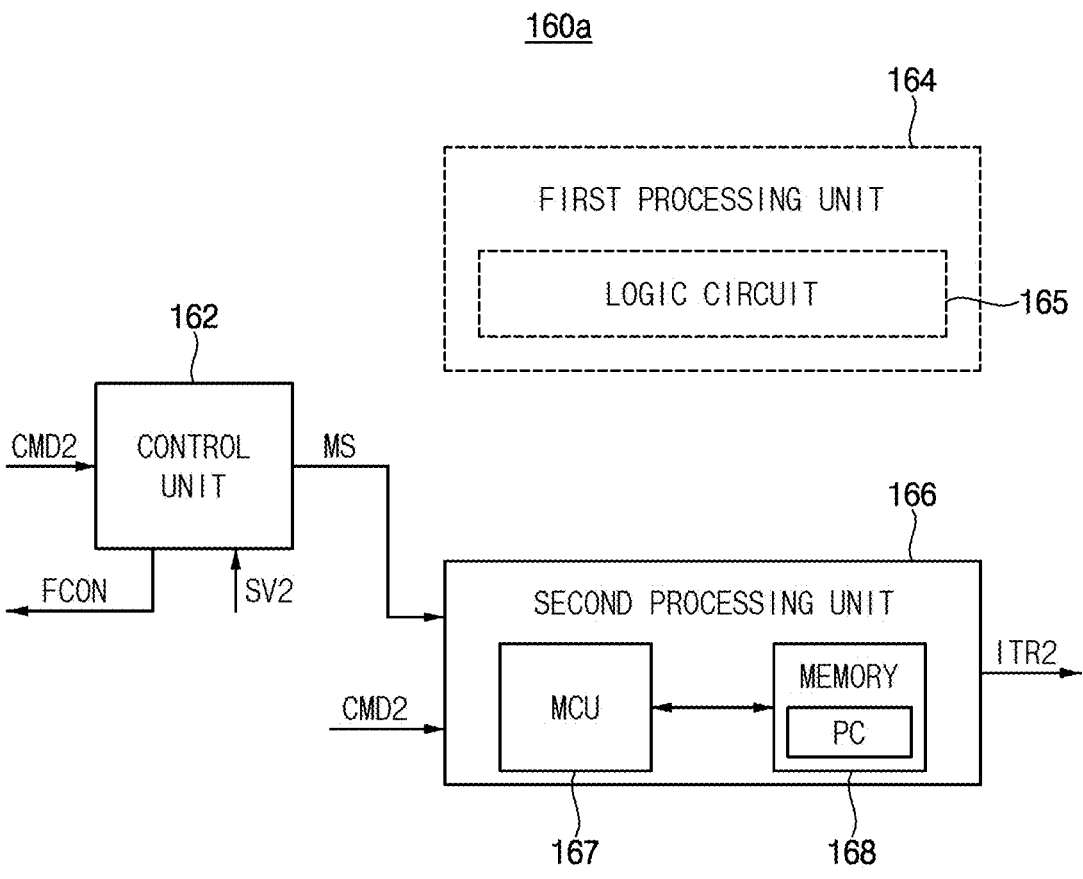

FIGS. 7A, 7B and 7C are diagrams for describing an operation of a post processing unit of FIG. 4. In FIGS. 7A, 7B and 7C, an operation of the post processing unit 160*a* of FIG. 4 is illustrated based on the example where the command processing scheme is determined and the control signal is generated in FIG. 6.

Referring to FIGS. 3, 7A, 7B and 7C, each of the plurality of setting values SV1, SV2, . . . SVX stored in the mode configuration unit 140*a* may include a mode setting value representing a command processing scheme.

For example, a first mode setting value included in the first setting value SV1 corresponding to the first command ID ID1 of the first command CMD1 may have a first value '0', and a second mode setting value included in the second setting value SV2 corresponding to the second command ID ID2 of the second command CMD2 may have a second value '1' different from the first value '0'. FIG. 7A illustrates an example where the first command CMD1 and the second command CMD2 are different types of commands.

When the first command CMD1 is provided to the post processing unit 160a as illustrated in FIG. 7B, the control unit 162 may obtain the first setting value SV1 from the mode configuration unit 140a based on the first command ID ID1 of the first command CMD1. Since the first mode setting value included in the first setting value SV1 has the first value '0', the control unit 162 may determine the command processing scheme for the first command CMD1 as the first processing scheme and may output the mode signal MS representing the first processing scheme. The first processing unit 164 may generate a first transaction TRSC1 by processing the first command CMD1 based on the first processing scheme using the plurality of logic circuits 165 and may output the first transaction TRSC1 as a first control signal corresponding to the first command CMD1. After the first command CMD1 is processed, the control unit 162 may generate the FIFO control signal FCON for updating the asynchronous FIFO unit 120a (e.g., for deleting the first command CMD1 from the asynchronous FIFO unit 120a).

When the second command CMD2 is provided to the post processing unit 160a as illustrated in FIG. 7C, the control unit 162 may obtain the second setting value SV2 from the mode configuration unit 140a based on the second command ID ID2 of the second command CMD2. Since the second mode setting value included in the second setting value SV2 has a second value '1', the control unit 162 may determine the command processing scheme for the second command CMD2 as the second processing scheme, and may output the mode signal MS representing the second processing scheme. The second processing unit 166 may generate a second interrupt ITR2 by processing the second command CMD2 based on the second processing scheme using the program codes PC that are stored in the memory 168 and executed by the MCU 167 and may output the second interrupt ITR2 as a second control signal corresponding to the second command CMD2. After the second command CMD2 is processed, the control unit 162 may generate the FIFO control signal FCON for updating the asynchronous FIFO unit 120a (e.g., for deleting the second command CMD2 from the asynchronous FIFO unit 120a).

In some example implementations, when the first command CMD1 is input to the asynchronous FIFO unit 120a first and then the second command CMD2 is input to the asynchronous FIFO unit 120a later, the operation of processing the first command CMD1 illustrated in FIG. 7B may be performed first, and then the operation of processing the second command CMD2 illustrated in FIG. 7C may be performed later. When the second command CMD2 is input to the asynchronous FIFO unit 120a first and then the first command CMD1 is input to the asynchronous FIFO unit 120a later, the operation of processing the second command CMD2 illustrated in FIG. 7C may be performed first, and then the operation of processing the first command CMD1 illustrated in FIG. 7B may be performed later.

In FIG. 7B, the second processing unit 166, which is not used in the operation of processing the first command CMD1, is illustrated by dotted lines. In FIG. 7C, the first processing unit 164, which is not used in the operation of processing the second command CMD2, is illustrated by dotted lines. In some example implementations, the components illustrated by dotted lines may be disabled or deactivated (e.g., the components illustrated by dotted lines may enter a low power mode or power supplied to the components illustrated by dotted lines may be blocked). However, example implementations are not limited thereto.

Figure 8:
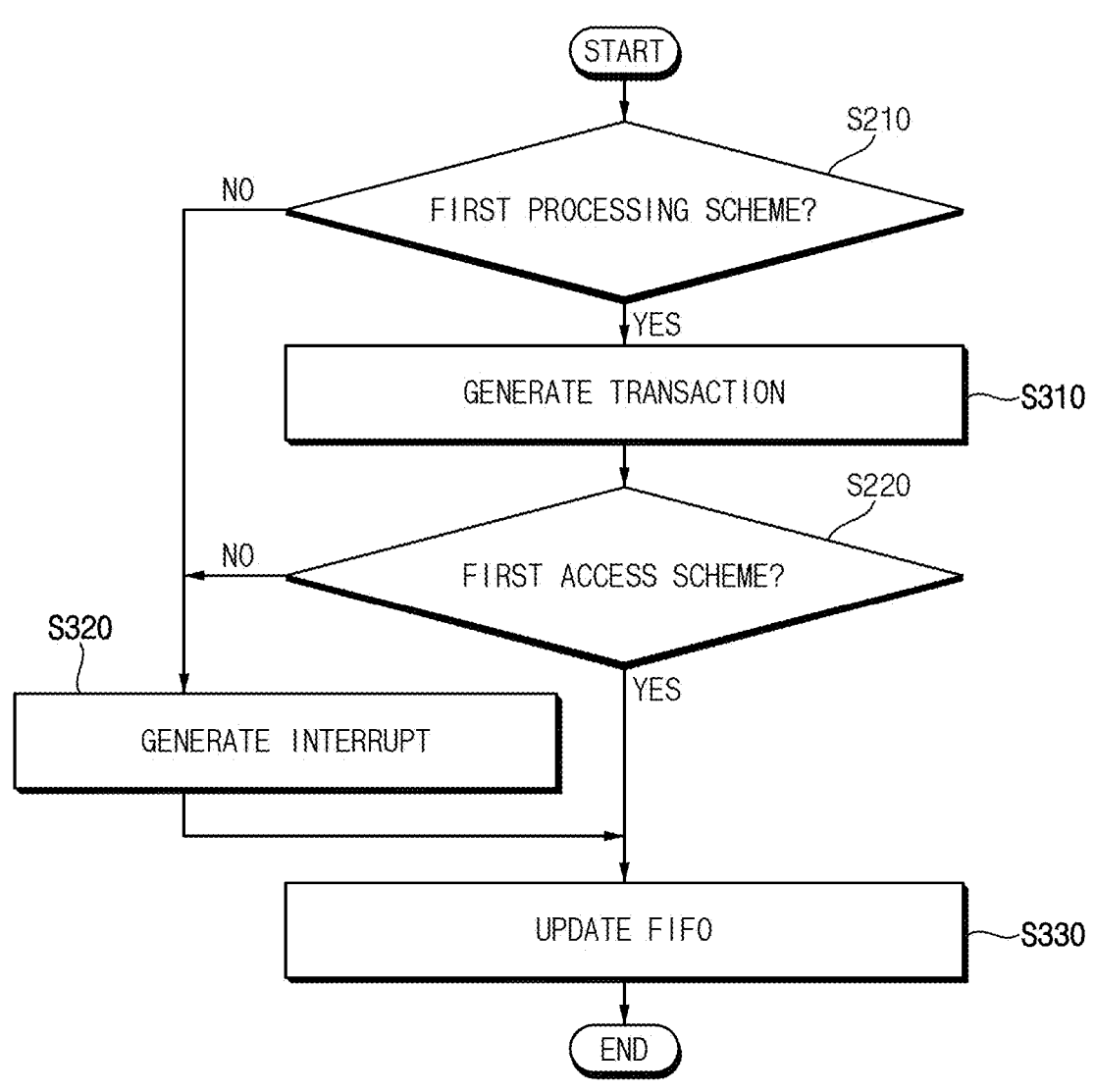
FIG. 8 is a flowchart illustrating an example of determining a command processing scheme and an example of generating a control signal in FIG. 5.

FIG. 8 is a flowchart illustrating an example of determining a command processing scheme and an example of generating a control signal in FIG. 5. The descriptions repeated with or overlapping with descriptions of FIG. 6 will be omitted in the interest of brevity.

Referring to FIG. 8, an example where a command processing scheme for one command is determined and one control signal is generated by processing one command is illustrated. Operations S210, S310, S320 and S330 may be substantially the same as those described with reference to FIG. 6.

When the command processing scheme for the specific command is determined to be the first processing scheme and the specific transaction is generated by processing the specific command based on the first processing scheme (operation S210: YES & operation S310), it may be additionally determined whether an access scheme for the specific command is the first access scheme or the second access scheme (operation S220). For example, as with operation S210, a specific setting value corresponding to a type of the specific command may be obtained based on the command ID of the specific command, and the access scheme for the specific command may be determined based on the specific setting value. For example, operation S220 may be included in operation S200 in FIG. 5. For example, operation S220 may be performed by the mode configuration unit 140a of FIG. 3 and the control unit 162 in FIG. 4.

When the access scheme for the specific command is determined to be the first access scheme (operation S220: YES), only the specific transaction generated by operation S310 may be output as the control signal corresponding to the specific command, without additional operations, and operation S330 may be performed thereafter.

When the access scheme for the specific command is determined to be the second access scheme (operation S220: NO), operation S320 may be additionally performed to generate the specific interrupt after operation S310 is performed, and operation S330 may be performed thereafter. In other words, both the specific transaction generated by processing the specific command based on the first processing scheme and the specific interrupt generated by processing the specific command based on the second processing scheme may be output as the control signals corresponding to the specific command.

When the command processing scheme for the specific command is determined to be the second processing scheme and the specific interrupt is generated by processing the specific command based on the second processing scheme (operation S210: NO & operation S320), the operation of determining the access scheme for the specific command in operation S220 may not be performed.

Figures 9A, 9B:
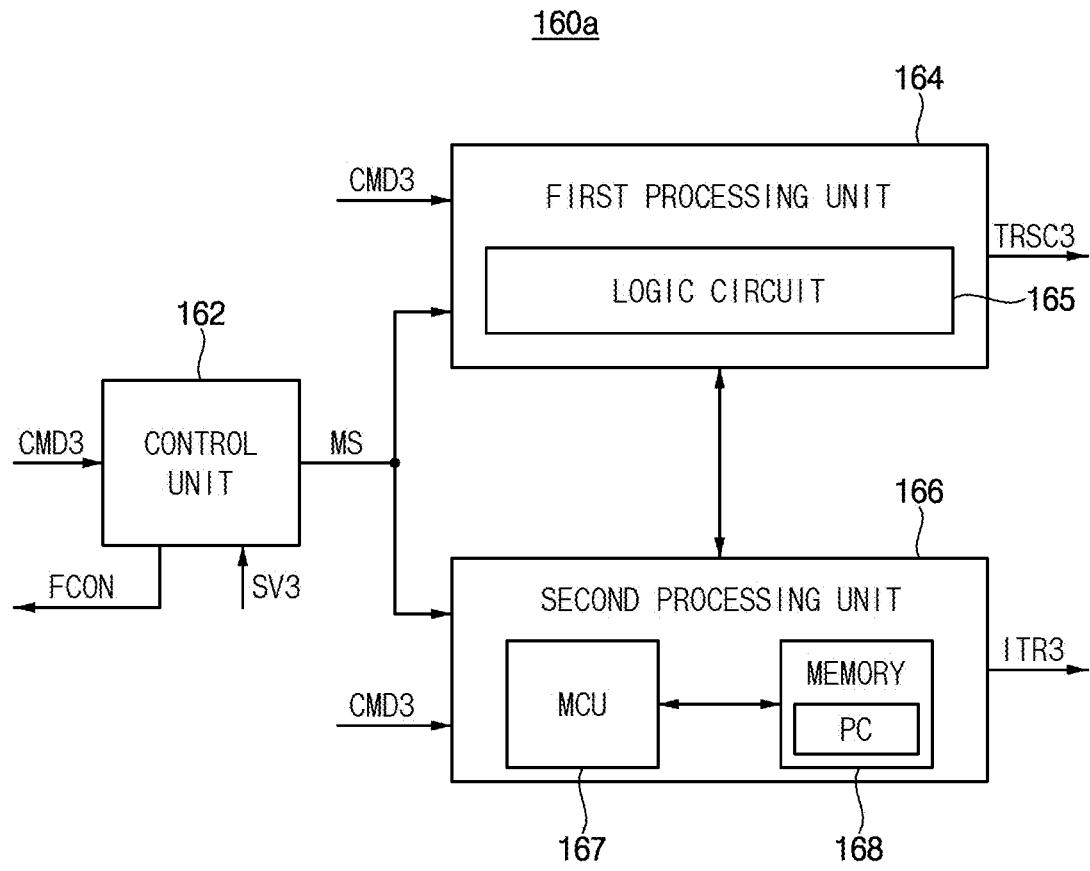
FIGS. 9A and 9B are diagrams for describing an operation of a post processing unit of FIG. 4.

FIGS. 9A and 9B are diagrams for describing an operation of a post processing unit of FIG. 4. In FIGS. 9A and 9B, an operation of the post processing unit 160a of FIG. 4 is illustrated based on the example where the command processing scheme is determined and the control signal is generated in FIG. 8. The descriptions repeated with or overlapping with descriptions of FIGS. 7A, 7B and 7C will be omitted in the interest of brevity.

Referring to FIGS. 3, 9A and 9B, each of the plurality of setting values SV1, SV2, . . . , SVX stored in the mode configuration unit 140a may include a mode setting value representing a command processing scheme and an access setting value representing an access scheme.

For example, a first access setting value included in the first setting value SV1 corresponding to the first command ID ID1 of the first command CMD1 and a second access setting value included in the second setting value SV2 corresponding to the second command ID ID2 of the second command CMD2 may have the first value '0'. A third mode setting value and a third access setting value, which are included in a third setting value SV3 corresponding to a third command ID ID3 of a third command CMD3 may be the first value ('0') and the second value '1', respectively. FIG. 9A illustrates an example where the first command CMD1, the second command CMD2 and the third command CMD3 are different types of commands.

When the third command CMD3 is provided to the post processing unit 160a as illustrated in FIG. 9B, the control unit 162 may obtain the third setting value SV3 from the mode configuration unit 140a based on the third command ID ID3 of the third command CMD3. Since the third mode setting value included in the third setting value SV3 has the first value '0', the control unit 162 may determine a command processing scheme for the third command CMD3 as the first processing scheme, and the first processing unit 164 may generate a third transaction TRSC3 by processing the third command CMD3 based on the first processing scheme using the plurality of logic circuits 165. In addition, since the third access setting value included in the third setting value SV3 has the second value '1', the control unit 162 may determine an access scheme for the third command CMD3 as the second access scheme, and the second processing unit 166 may additionally generate a third interrupt ITR3 by processing the third command CMD3 based on the second processing scheme using the program codes PC that are stored in the memory 168 and executed by the MCU 167. Both the third transaction TRSC3 and the third interrupt ITR3 may be output as third control signals corresponding to the third command CMD3. After the third command CMD3 is processed, the control unit 162 may generate the FIFO control signal FCON for updating the asynchronous FIFO unit 120a (e.g., for deleting the third command CMD3 from the asynchronous FIFO unit 120a).

Since the first access setting value included in the first setting value SV1 has the first value '0', the control unit 162 may determine an access scheme for the first command CMD1 as the first access scheme, and only the first transaction TRSC1 may be output as the first control signal corresponding to the first command CMD1, as described with reference to FIG. 7B. When the command processing scheme for the second command CMD2 is determined to be the second processing scheme, the control unit 162 may not determine an access scheme for the second command CMD2 regardless of the second access setting value included in the second setting value SV2.

Figure 10:
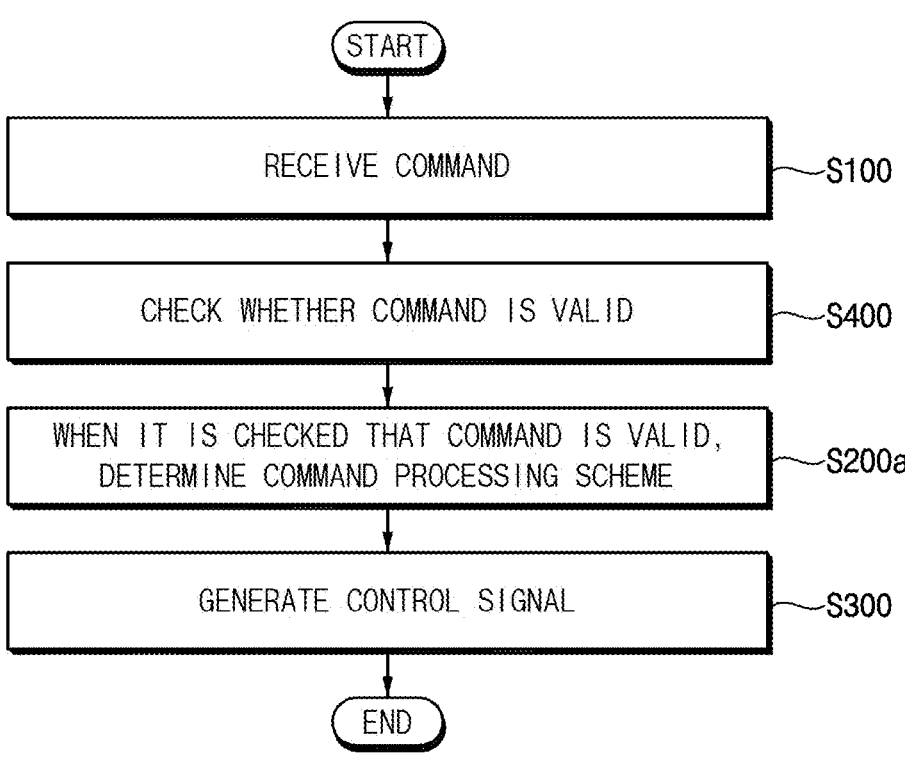
FIG. 10 is a flowchart illustrating a method of processing a command according to example implementations.

FIG. 10 is a flowchart illustrating a method of processing a command according to example implementations. The descriptions repeated with or overlapping with descriptions of FIG. 5 will be omitted in the interest of brevity.

Referring to FIG. 10, in a method of processing a command according to example implementations, operation S100 may be substantially the same as that described with reference to FIG. 5.

After operation S100, it may be checked whether the plurality of commands are valid (operation S400). The operation of determining the command processing scheme in operation S200a and the operation of generating the control signal in operation S300 may be performed only on valid commands. Operation S200a may be substantially the same as operation S200 in FIG. 5. For example, operation S400 may be performed by the mode configuration unit 140 and the post processing unit 160 in FIG. 1.

Figure 11:
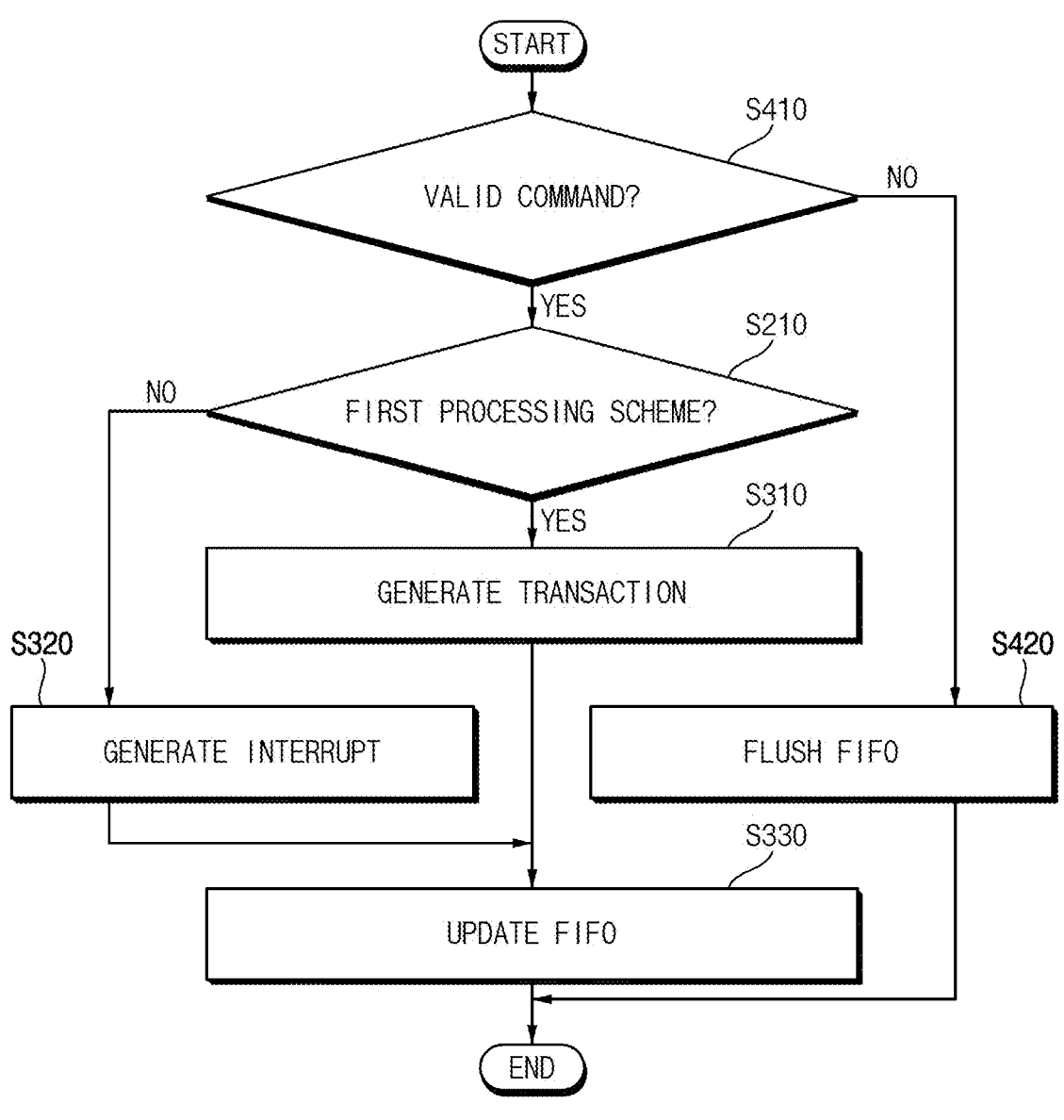
FIGS. 11 and 12 are flowcharts illustrating examples of checking whether a command is valid, examples of determining a command processing scheme and examples of generating a control signal in FIG. 10.
Figure 12:
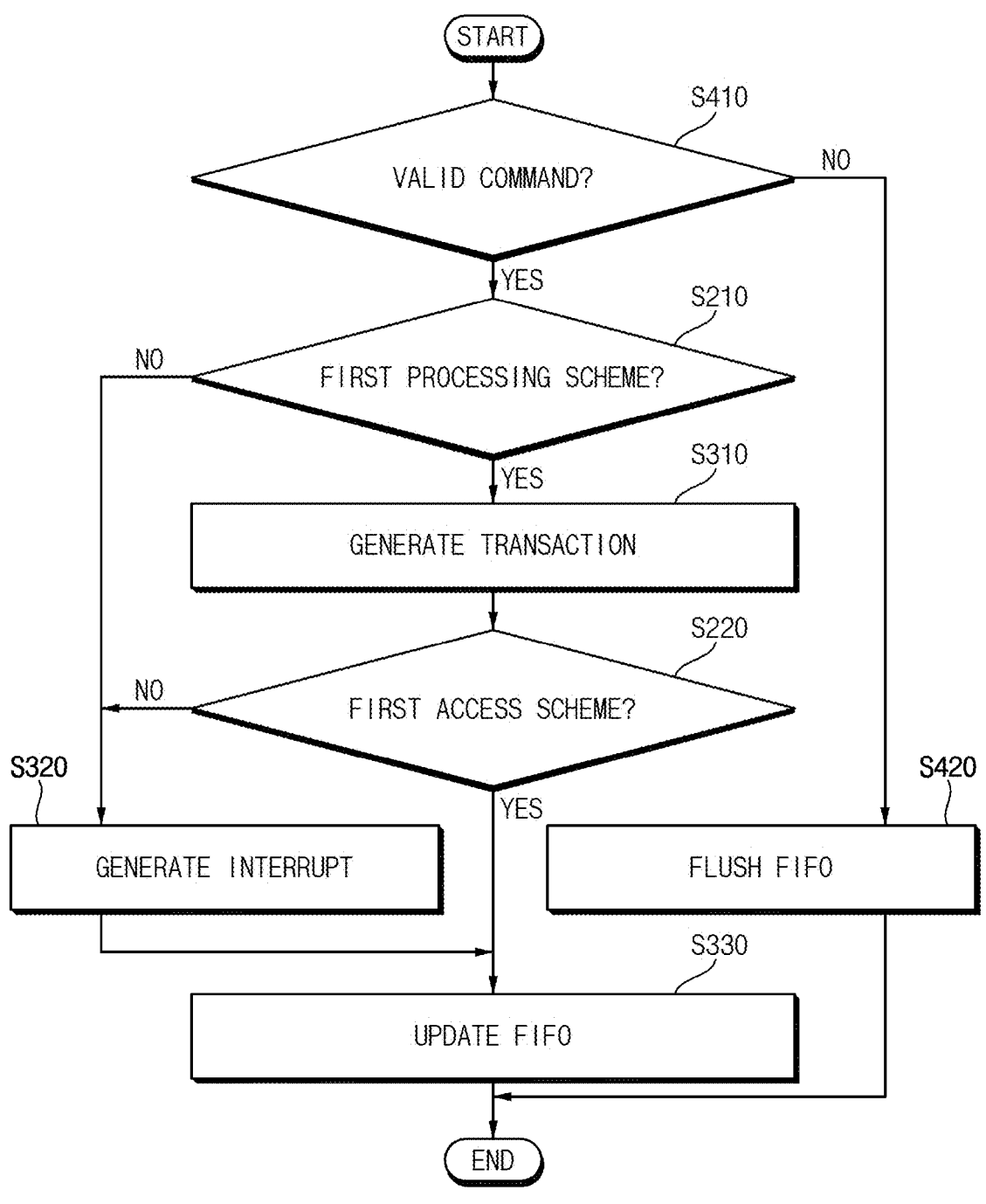

FIGS. 11 and 12 are flowcharts illustrating examples of checking whether a command is valid, examples of determining a command processing scheme and examples of generating a control signal in FIG. 10. The descriptions repeated with or overlapping with descriptions of FIGS. 6 and 8 will be omitted in the interest of brevity.

Referring to FIG. 11, an example where a command processing scheme for one command is determined and one control signal is generated by processing one command is illustrated. Operations S210, S310, S320 and S330 may be substantially the same as those described with reference to FIG. 6.

Before the command processing scheme for the specific command is determined, it may be checked whether the specific command is valid (operation S410). For example, the plurality of setting values may be searched based on the command ID of the specific command to determine whether the specific command is a valid command. For example, operation S410 may be included in operation S400 in FIG. 10. For example, operation S410 may be performed by the mode configuration unit 140a of FIG. 3 and the control unit 162 in FIG. 4.

When it is checked that the specific command is valid (operation S410: YES), operations steps S210, S310, S320 and S330 described with reference to FIG. 6 may be performed. When it is checked that the specific command is invalid (operation S410: NO), operations S210, S310, S320 and S330 may not be performed, and the asynchronous FIFO unit 120 may be flushed to delete the specific command (operation S420). For example, an invalid command may be deleted from the asynchronous FIFO unit 120 based on the FIFO control signal FCON generated from the control unit 162. For example operation S420 may be included in operation S400 in FIG. 10.

Referring to FIG. 12, an example is illustrated in which a command processing scheme for one command is determined and one control signal is generated by processing one command. Operations S210, S310, S320 and S330 may be substantially the same as those described with reference to FIG. 6. Operation S220 may be substantially the same as that described with reference to FIG. 8. Operations S410 and S420 may be substantially the same as those described with reference to FIG. 11.

Figure 13C:
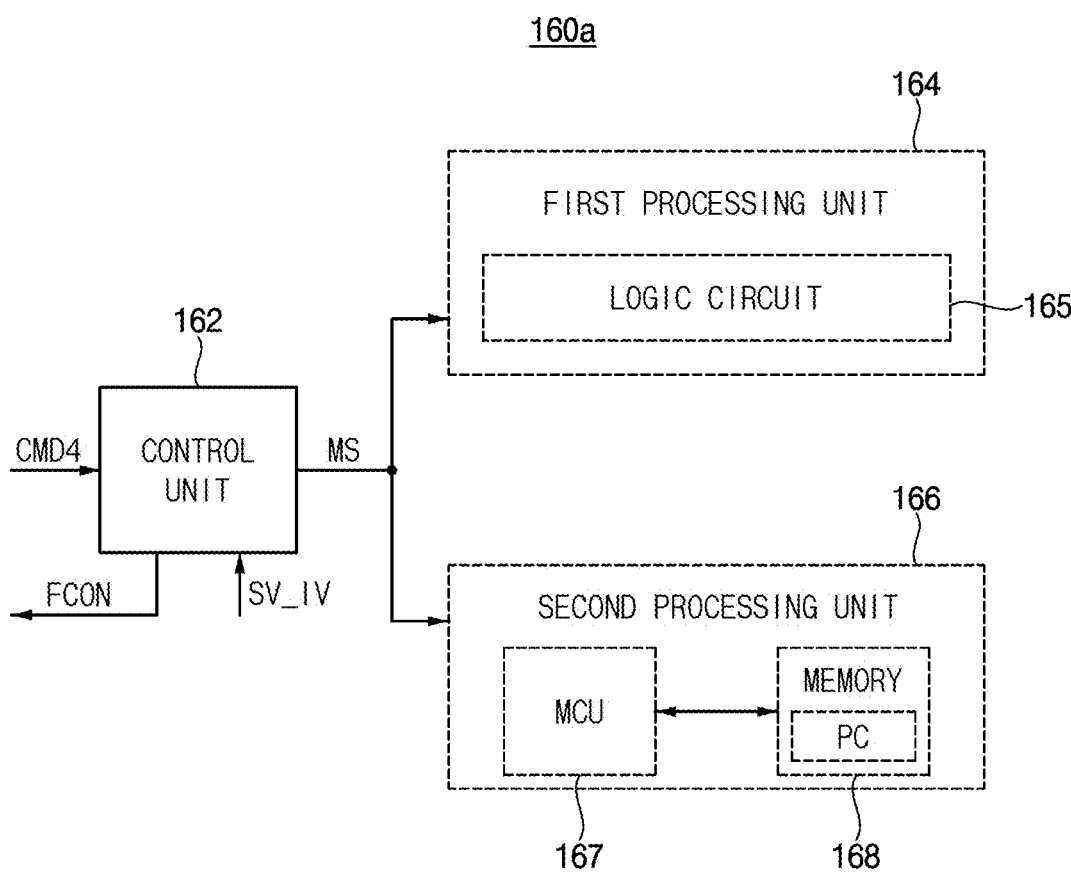

FIGS. 13A, 13B and 13C are diagrams for describing an operation of a post processing unit of FIG. 4. In FIGS. 13A, 13B and 13C, an operation of the post processing unit 160a of FIG. 4 is illustrated based on the examples where it is checked whether the command is valid, the command processing scheme is determined and the control signal is generated in FIGS. 11 and 12. The descriptions repeated with or overlapping with descriptions of FIGS. 7A, 7B, 7C, 9A and 9B will be omitted in the interest of brevity.

Referring to FIGS. 3, 13A, 13B and 13C, each of the plurality of setting values SV1, SV2, . . . , SVX stored in the mode configuration unit 140a may include a mode setting value similar to that described with reference to FIG. 7A, or may include a mode setting value and an access setting value similar to those described with reference to FIG. 9A.

For example, a fourth setting value corresponding to a fourth command ID ID4 of a fourth command CMD4 may not exist or may have an invalid value. For example, as illustrated in FIG. 13A, a fourth mode setting value included in the fourth setting value may not have a specific value, For example, as illustrated in FIG. 13B, a fourth mode setting value and a fourth access setting value included in the fourth setting value may not have specific values.

When the fourth command CMD4 is provided to the post processing unit 160*a* as illustrated in FIG. 13C, the control unit 162 may not obtain the fourth setting value from the mode configuration unit 140*a* based on the fourth command ID ID4 of the fourth command CMD4, and may receive an invalid setting value SV_IV, e.g., a signal representing that the fourth setting value does not exist or has an invalid value. The control unit 162 may determine that the fourth command (CMD4) is invalid, may not perform the operation of determining a command processing scheme for the fourth command CMD4 and/or the operation of determining an access scheme for the fourth command CMD4. Thus, the fourth command CMD4 may not be processed. Thereafter, the control unit 162 may generate the FIFO control signal FCON for flushing the asynchronous FIFO unit 120*a* (e.g., for deleting the fourth command CMD4 from the asynchronous FIFO unit 120*a*).

Figure 14:
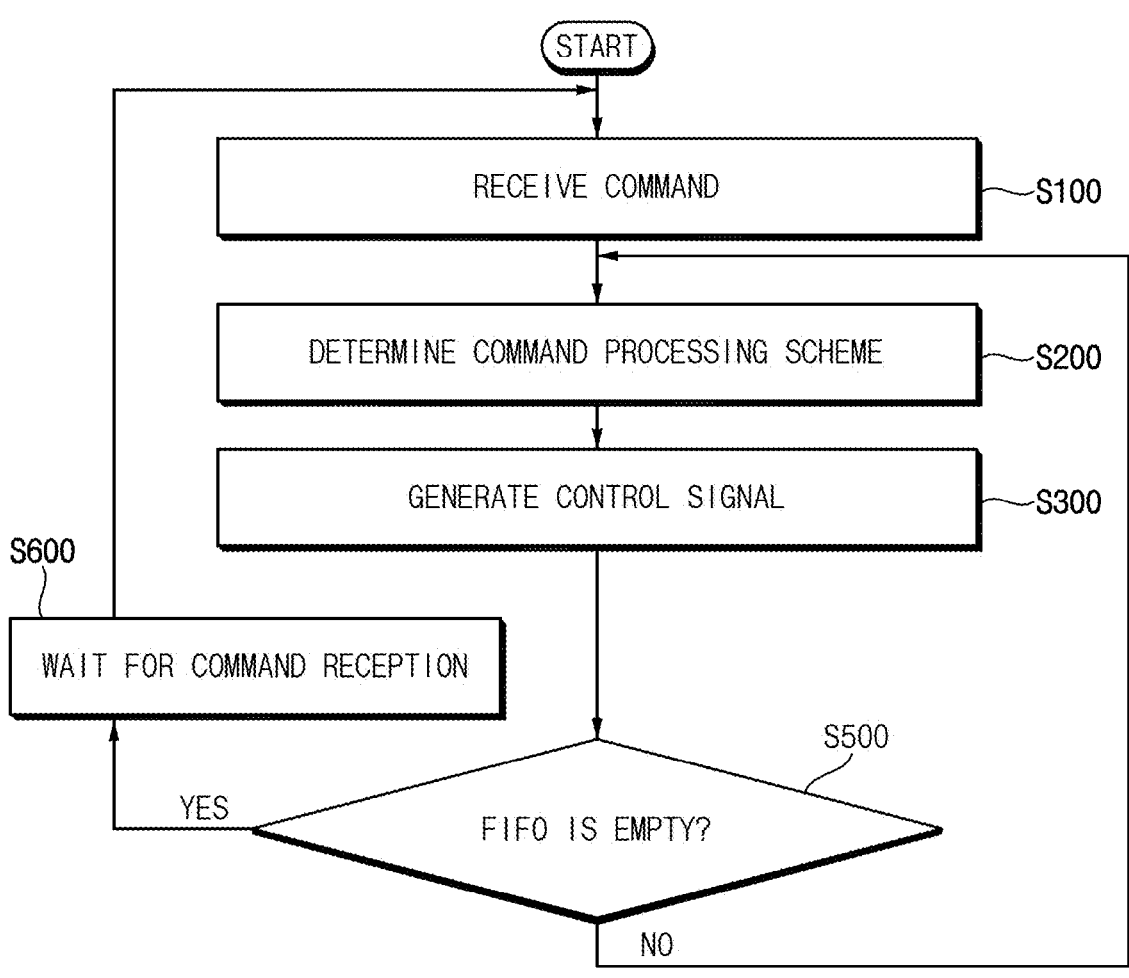
FIGS. 14 and 15 are flowcharts illustrating a method of processing a command according to example implementations.
Figure 15:
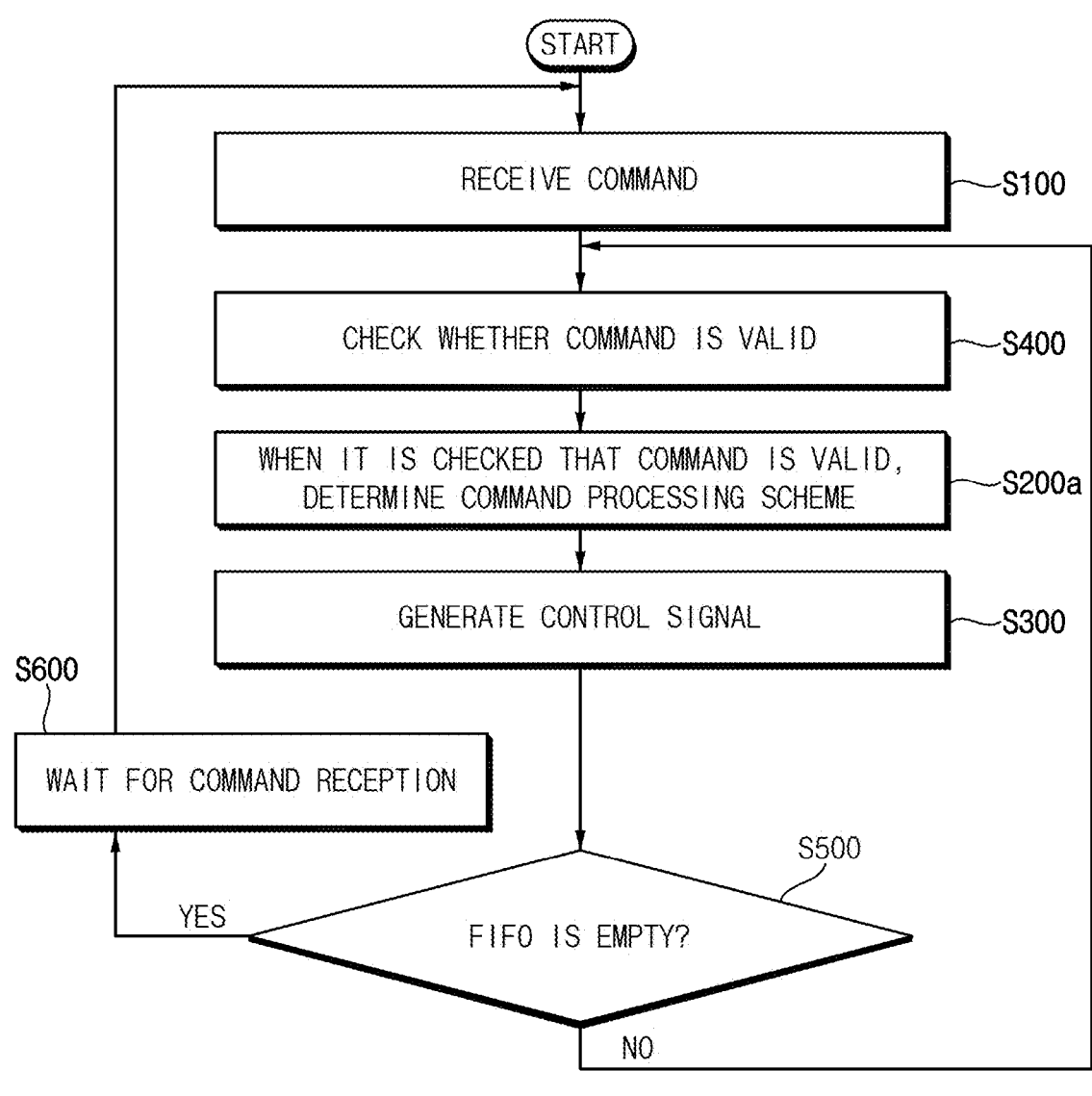

FIGS. 14 and 15 are flowcharts illustrating a method of processing a command according to example implementations. The descriptions repeated with or overlapping with descriptions of FIGS. 5 and 10 will be omitted in the interest of brevity.

Referring to FIG. 14, in a method of processing a command according to example implementations, operations S100, S200 and S300 may be substantially the same as those described with reference to FIG. 5.

After operation S300, it may be checked whether the asynchronous FIFO unit in which the plurality of commands are stored is empty, e.g., whether all received commands have been processed (operation S500).

When the asynchronous FIFO unit is empty (operation S500: YES), e.g., when all received commands have been processed, a reception of at least one additional command may be waited for (operation S600). Thereafter, when the at least one additional command is received, operations S100, S200 and S300 may be repeatedly performed.

When the asynchronous FIFO unit is not empty (operation S500: NO), e.g., when all received commands have not yet been processed or other commands are additionally received during the command processing, operations S200 and S300 may be repeatedly performed. For example, operations S500 and S600 may be performed by the asynchronous FIFO unit 120 and the post processing unit 160 in FIG. 1.

Referring to FIG. 15, in a method of processing a command according to example implementations, operations S100 and S300 may be substantially the same as those described with reference to FIG. 5, operations S400 and S200*a* may be substantially the same as those described with reference to FIG. 10, and operations S500 and S600 may be substantially the same as those described with reference to FIG. 14.

FIGS. 16A and 16B are diagrams for describing an operation of a command processing device according to example implementations.

Referring to FIGS. 16A and 16B, an example of a plurality of DCS read commands and a plurality of DCS write commands defined in the MIPI DCS specification is illustrated. Although not illustrated in detail, various other DCS commands may be defined. Such DCS commands may be input to and processed by the command processing device 100 according to example implementations.

In some example implementations, the plurality of DCS read commands may have limited response speed (e.g., should be processed relatively rapidly), and thus command processing schemes of the plurality of DCS read commands may be preset and stored as the first processing scheme (e.g., hardware scheme).

In some example implementations, among the plurality of DCS write commands, command processing schemes of some DCS write commands used as triggers may be preset and stored as the second processing scheme (e.g., software scheme).

In some example implementations, command processing schemes of commands added as a custom specification (or a customer-specific specification) may be set and stored as the second processing scheme (e.g., software scheme).

In some example implementations, command processing schemes of commands requiring the indirect access scheme may be set and stored to use both the first processing scheme (e.g., hardware scheme) and the second processing scheme (e.g., software scheme). For example, when a large amount of data are to be received and processed, the first processing scheme may be used for command processing and data copying that require relatively fast processing, and the second processing scheme may be used later for operations such as image processing using actual data.

In the command processing device 100 according to example implementations, in a situation where various types of above-described commands are mixed and transferred randomly, such various types of commands may be processed separately by command (e.g., by command ID). Accordingly, various DCS Commands may be flexibly processed depending on required characteristics, and thus the workload and requirements of the device and/or system may be reduced. In addition, example implementations may be easily implemented by manually setting the first and second processing schemes (e.g., hardware and software schemes) for each command (e.g., for each command ID).

As will be appreciated by those skilled in the art, these ideas may be embodied as a system, a method, a computer program product, and/or a computer program product embodied in one or more computer readable medium(s) having computer readable program code embodied thereon. The computer readable program code may be provided to a processor of a general purpose computer, a special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 17:
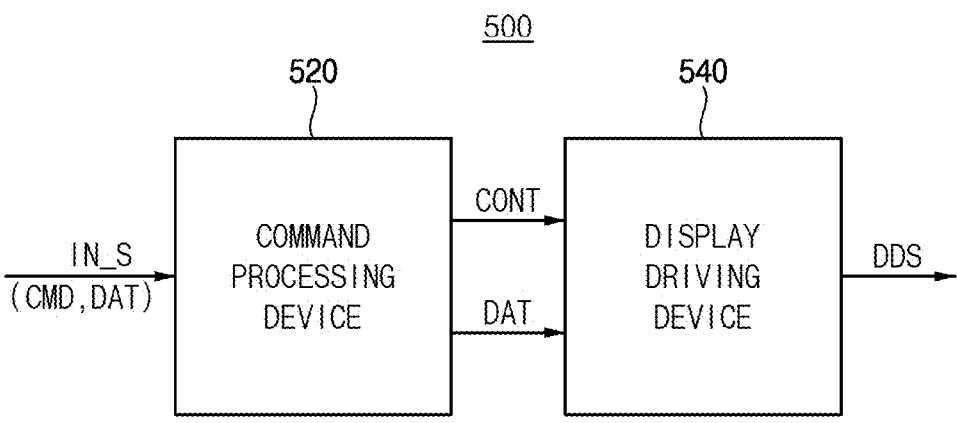
FIG. 17 is a block diagram illustrating a display driving integrated circuit according to example implementations.

FIG. 17 is a block diagram illustrating a display driving integrated circuit according to example implementations.

Referring to FIG. 17, a display driving integrated circuit 500 includes a command processing device 520 and a display driving device 540.

The command processing device 520 receives a plurality of signals IN_S including a plurality of commands CMD and a plurality of data DAT from an external device (e.g., from a host processor 920 in FIG. 21), and generates a plurality of control signals CONT based on a plurality of commands CMD. For example, the command processing device 520 may be the command processing device according to example implementations described with reference to FIGS. 1 through 16B. For example, the command processing device 520 may generate the plurality of control signals CONT by processing the plurality of commands CMD based on the first processing scheme (e.g., hardware scheme) or the second processing scheme (e.g., software scheme) depending on the types of the commands.

The display driving device 540 generates display driving signals DDS for driving a display panel based on the plurality of control signals CONT and the plurality of data DAT. Examples of the display driving device 540 will be described with reference to FIGS. 18A and 18B.

In some example implementations, the display driving integrated circuit 500, and the command processing device 520 and the display driving device 540 that are included in the display driving integrated circuit 500 may be implemented to comply with the MIPI DSI standard, the MIPI D-PHY standard and/or the MIPI DCS standard.

Figure 18A:
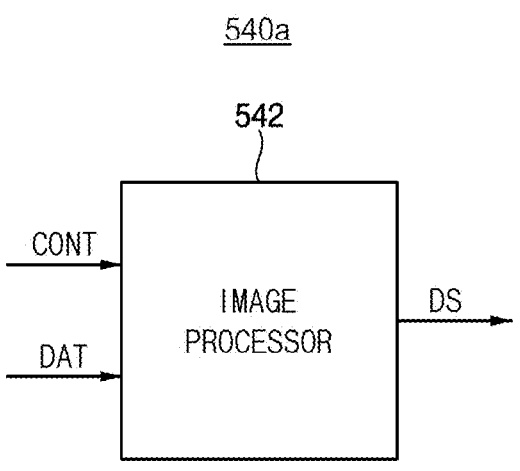
FIGS. 18A and 18B are block diagrams illustrating examples of a display driving device included in a display driving integrated circuit of FIG. 17.
Figure 18B:
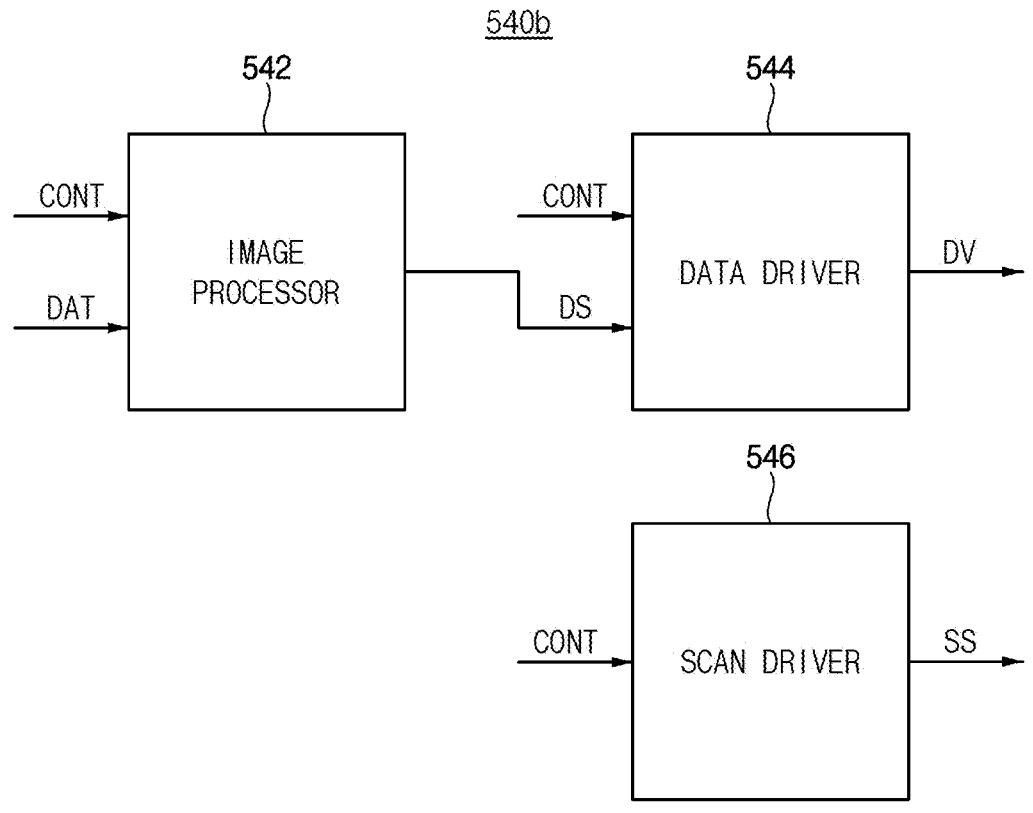

FIGS. 18A and 18B are block diagrams illustrating examples of a display driving device included in a display driving integrated circuit of FIG. 17.

Referring to FIG. 18A, a display driving device 540a may include an image processor 542. The image processor 542 may generate a data signal DS for displaying an image based on the plurality of control signals CONT and the plurality of data DAT. For example, the image processor 542 may selectively perform at least one of various image processing steps such as an image quality compensation, a spot compensation, an adaptive color correction (ACC), and/or a dynamic capacitance compensation (DCC).

Referring to FIG. 18B, a display driving device 540b may include an image processor 542, a data driver 544 and a scan driver 546. The image processor 542 may be substantially the same as that described with reference to FIG. 18A. The data driver 544 may generate a plurality of data voltages DV applied to a plurality of data lines based on the plurality of control signals CONT and the data signal DS. The scan driver 546 may generate a plurality of scan signals SS applied to a plurality of scan lines based on the plurality of control signals CONT.

Figure 19:
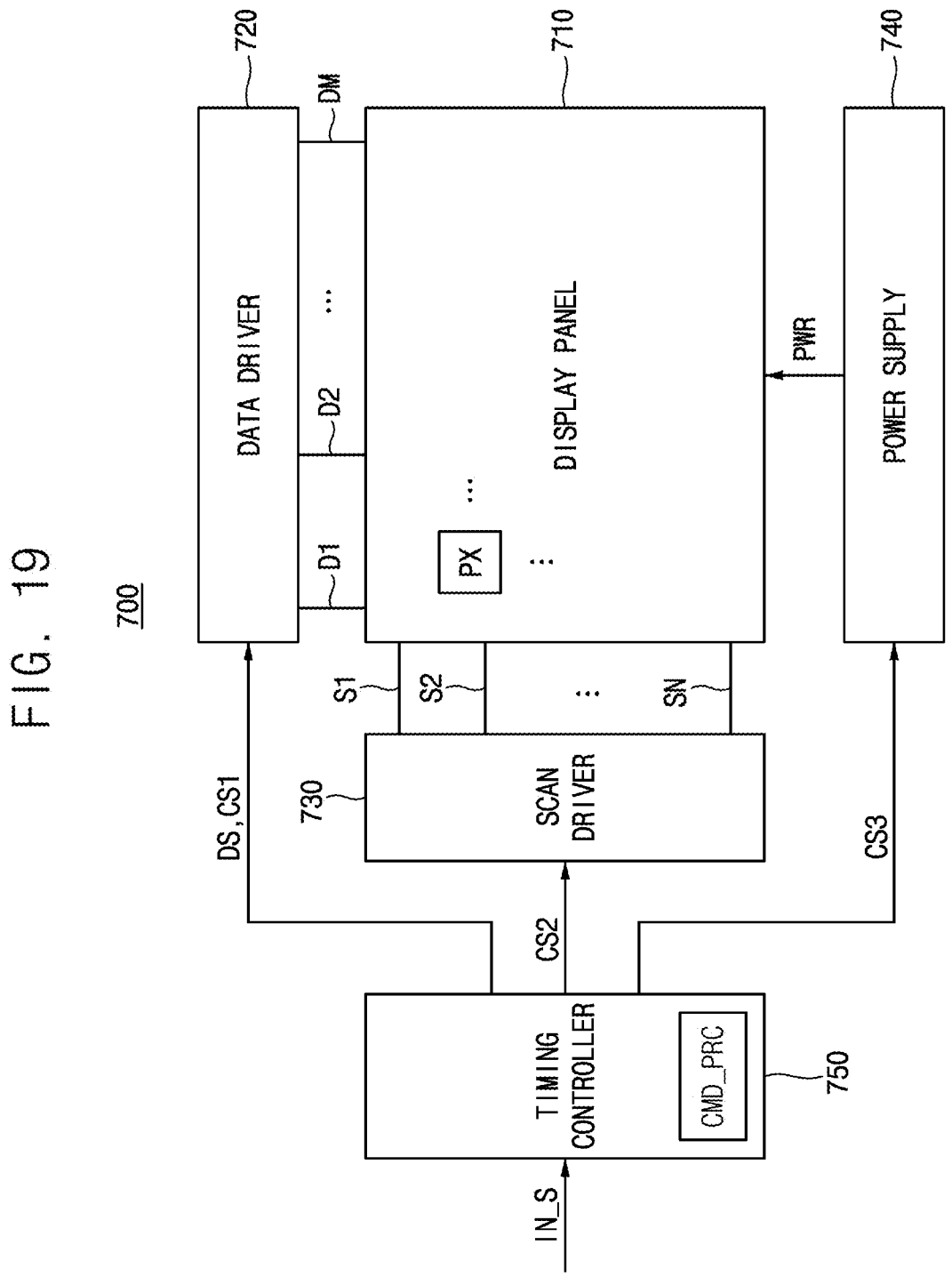
FIG. 19 is a block diagram illustrating a display device according to example implementations.

FIG. 19 is a block diagram illustrating a display device according to example implementations.

Referring to FIG. 19, a display device 700 includes a display panel 710 and a display driving integrated circuit. The display driving integrated circuit may control an operation of the display panel 710, and may include a data driver 720, a scan driver 730, a power supply 740 and a timing controller 750.

The display panel 710 operates (e.g., displays an image) based on image data (e.g., based on frame data). The display panel 710 may be connected to the data driver 720 through a plurality of data lines D1, D2, . . . , DM (where M is a positive integer greater than or equal to two), and may be connected to the scan driver 730 through a plurality of scan lines S1, S2, . . . , SN (where N is a positive integer greater than or equal to two). The plurality of data lines D1, D2, . . . , DM may extend in a first direction, and the plurality of scan lines S1, S2, . . . , SN may extend in a second direction crossing (e.g., substantially perpendicular to) the first direction.

The display panel 710 may include a plurality of pixels PX that are arranged in a matrix form having a plurality of rows and a plurality of columns. For example, each of the plurality of pixels PX may include a light emitting element and at least one transistor for driving the light emitting element. For another example, each of the plurality of pixels PX may include a liquid crystal capacitor and at least one transistor for driving the liquid crystal capacitor. Each of the plurality of pixels PX may be electrically connected to a respective one of the plurality of data lines D1, D2, . . . , DM and a respective one of the plurality of scan lines S1, S2, . . . , SN. Examples of each pixel will be described with reference to FIGS. 20A and 20B.

The timing controller 750 may control overall operations of the display device 700. For example, the timing controller 750 may receive a plurality of signals IN_S from a host processor (e.g., from a host processor 920 in FIG. 21), and may provide predetermined control signals CS1, CS2 and CS3 to the data driver 720, the scan driver 730 and the power supply 740 based on the plurality of signals IN_S to control the operations of the display device 700.

The timing controller 750 may include a command processing device CMD_PRC. The command processing device CMD_PRC may be the command processing device according to example implementations described with reference to FIGS. 1 through 16B. The command processing device CMD_PRC may generate a plurality of control signals (e.g., the control signals CONT in FIG. 1) by processing a plurality of commands (e.g., the commands CMD in FIG. 1) included in the plurality of signals IN_S based on the first processing scheme (e.g., hardware scheme) or the second processing scheme (e.g., software scheme) depending on the types of the commands. For example, the control signals CS1, CS2 and CS3 in FIG. 17 may correspond to the control signals CONT in FIG. 1.

The timing controller 750 may generate a data signal DS for displaying an image based on a plurality of data (e.g., the data DAT1, DAT2, . . . , DATK in FIG. 2) (e.g., the frame data) included in the plurality of signals IN_S. For example, the plurality of data may include red image data, green image data and blue image data. In addition, the plurality of data may include white image data. Alternatively, the plurality of data may include magenta image data, yellow image data, cyan image data, or the like.

The data driver 720 may generate a plurality of data voltages based on the control signal CS1 and the data signal DS, and may apply the plurality of data voltages to the display panel 710 through the plurality of data lines D1, D2, . . . , DM. For example, the data driver 720 may include a digital-to-analog converter (DAC) that converts the data signal DS in a digital form into the plurality of data voltages in an analog form.

The scan driver 730 may generate a plurality of scan signals based on the control signal CS2, and may apply the plurality of scan signals to the display panel 710 through the plurality of scan lines S1, S2, . . . , SN. The plurality of scan lines S1, S2, . . . , SN may be sequentially activated based on the plurality of scan signals.

In some example implementations, the timing controller 750 may further include the image processor 542 in FIGS. 18A and 18B, and the data driver 720 and scan driver 730 may correspond to the data driver 544 and scan driver 546 in FIG. 18B, respectively.

In some example implementations, the data driver 720, the scan driver 730 and the timing controller 750 may be implemented as one integrated circuit. In other example implementations, the data driver 720, the scan driver 730 and the timing controller 750 may be implemented as two or more integrated circuits. A driving module including at least the timing controller 750 and the data driver 720 may be referred to as a timing controller embedded data driver (TED).

The power supply 740 may supply at least one power supply voltage PWR to the display panel 710 based on the control signal CS3.

In some example implementations, at least some of the elements included in the display driving integrated circuit may be disposed (e.g., directly mounted) on the display panel 710 or may be connected to the display panel 710 in a tape carrier package (TCP). Alternatively, at least some of the elements included in the display driving integrated circuit may be integrated on the display panel 710. In some example implementations, the elements included in the display driving integrated circuit may be respectively implemented with separate circuits/modules/chips. In other example implementations, on the basis of a function, some of the elements included in the display driving integrated circuit may be combined into one circuit/module/chip or may be further separated into a plurality of circuits/modules/chips.

Although not illustrated in detail, the display device 700 may further include a frame buffer for storing frame data, a backlight unit, etc. depending on a type of the pixels PX, a driving scheme of the display panel 710, etc.

Figures 20A, 20B:
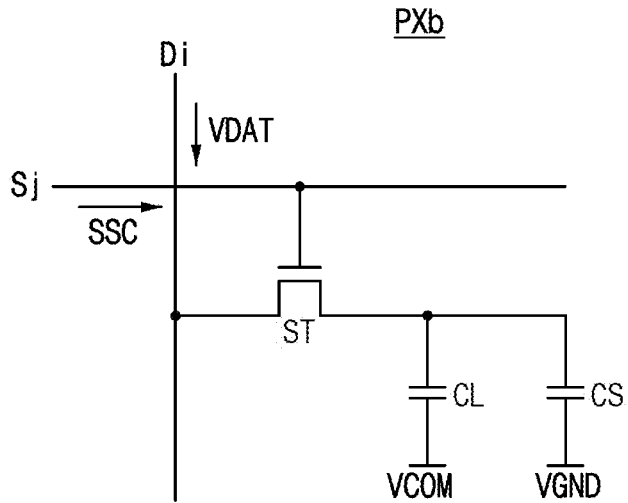
FIGS. 20A and 20B are circuit diagrams illustrating examples of a pixel included in a display panel included in a display device of FIG. 19.

FIGS. 20A and 20B are circuit diagrams illustrating examples of a pixel included in a display panel included in a display device of FIG. 19.

Referring to FIG. 20A, each pixel PXa may include a switching transistor TS, a storage capacitor CST, a driving transistor TD and an organic light emitting diode EL.

The switching transistor TS may have a first electrode connected to a data line Di, a second electrode connected to the storage capacitor CST, and a gate electrode connected to a scan line Sj. The switching transistor TS may transfer a data voltage VDAT received from the data driver 720 to the storage capacitor CST in response to a scan signal SSC received from the scan driver 730.

The storage capacitor CST may have a first electrode connected to a first power supply voltage ELVDD and a second electrode connected to a gate electrode of the driving transistor TD. The storage capacitor CST may store the data voltage VDAT transferred through the switching transistor TS.

The driving transistor TD may have a first electrode connected to the first power supply voltage ELVDD, a second electrode connected to the organic light emitting diode EL, and the gate electrode connected to the storage capacitor CST. The driving transistor TD may be turned on or off depending on the data voltage VDAT stored in the storage capacitor CST.

The organic light emitting diode EL may have an anode electrode connected to the driving transistor TD and a cathode electrode connected to a second power supply voltage ELVSS. The organic light emitting diode EL may emit light based on a current flowing from the first power supply voltage ELVDD to the second power supply voltage ELVSS while the driving transistor TD is turned on. The brightness of the pixel PXa may increase as the current flowing through the organic light emitting diode EL increases.

The first power supply voltage ELVDD and the second power supply voltage ELVSS may be included in the at least one power supply voltage PWR in FIG. 19. For example, the first power supply voltage ELVDD may be a high power supply voltage, and the second power supply voltage ELVSS may be a low power supply voltage.

In some example implementations, the display panel 710 including the pixel PXa may be a self-emitting display panel that emits light without the use of a backlight unit. For example, the display panel 710 may be an organic light emitting display panel that includes an organic light emitting diode (OLED) as the light emitting element.

In some example implementations, the display panel 710 including the pixel PXa may have relatively excellent retention characteristics capable of performing a low frequency driving. For example, the display panel 710 may be an oxide-based organic light emitting display panel that includes an organic light emitting diode as the light emitting element and includes the at least one transistor including low-temperature polycrystalline oxide (LTPO).

In some example implementations, the switching transistor TS and the driving transistor TD may include LTPO. For example, the driving transistor TD may be a low-temperature poly-silicon (LTPS) thin film transistor (TFT) including LTPS, and the switching transistor TS may be an oxide TFT including oxide semiconductor. The LTPS TFT may be suitable or appropriate for current driving because of a relatively high electron mobility. The oxide TFT may be suitable or appropriate for switching because of a relatively low leakage current. Thus, when the LTPS TFT and the oxide TFT are used together, excellent characteristics (e.g., the excellent retention characteristics) may be obtained. A pixel that includes both the LTPS TFT and the oxide TFT may be referred to as a LTPO pixel, and a display panel that includes the LTPO pixel may be referred to as a hybrid oxide panel (HOP). For example, the HOP may maintain an image for a maximum of about one second with a single update, and thus the HOP may be driven with relatively low frequency even if the display driving integrated circuit does not include a frame buffer, thereby reducing the power consumption.

In some example implementations, the pixel PXa may have various configurations depending on a driving scheme of the display device 700. For example, the display device 700 may be driven with an analog or a digital driving scheme. While the analog driving scheme produces grayscale using variable voltage levels corresponding to input data, the digital driving scheme produces grayscale using a variable time duration in which the light emitting diode emits light. The analog driving scheme is difficult to implement because it requires a driving integrated circuit (IC) that is complicated to manufacture if the display is large and has a high resolution. The digital driving scheme, on the other hand, can readily accomplish the required high resolution through a simpler IC structure.

Referring to FIG. 20B, each pixel PXb may include a switching transistor ST, a liquid crystal capacitor CL and a storage capacitor CS.

The switching transistor ST may connect the capacitors CL and CST to a corresponding data line Di in response to a scan signal SSC transferred through a corresponding gate line Sj. The liquid crystal capacitor CL may be connected between the switching transistor ST and a common voltage VCOM. The storage capacitor CST may be connected between the switching transistor ST and a ground voltage VGND. The liquid crystal capacitor CL may adjust the amount of transmitted light depending on data stored in the storage capacitor CST by a data voltage VDAT.

The common voltage VCOM and the ground voltage VGND may be included in the at least one power supply voltage PWR in FIG. 19.

In some example implementations, the display panel 710 including the pixel PXb may be an LCD panel using a backlight. The LCD panel may also operate based on the low frequency driving.

Figure 21:
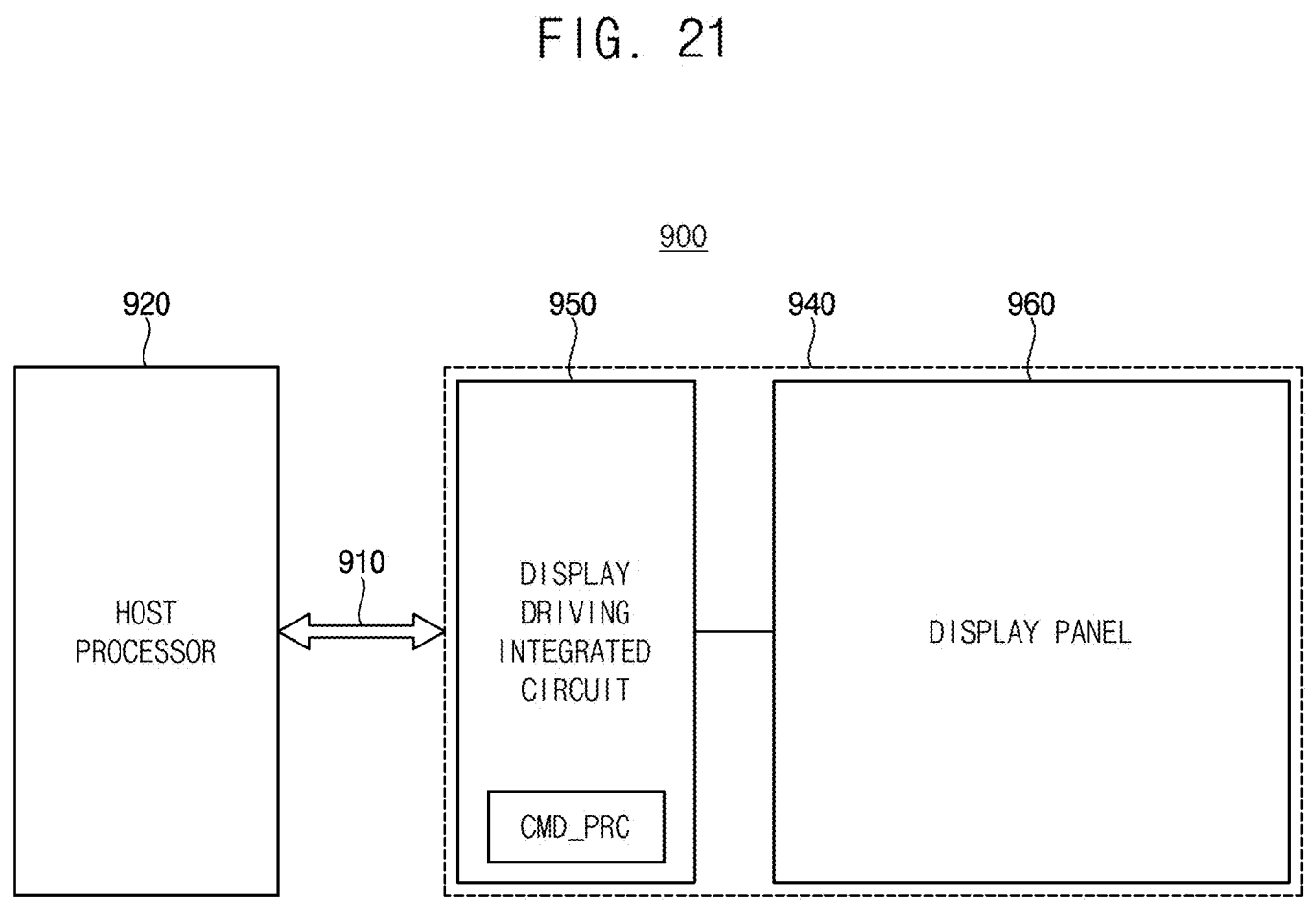

FIG. 21 is a block diagram illustrating a display system according to example implementations.

Referring to FIG. 21, a display system 900 includes a channel 910, a host processor 920 and a display device 940.

The host processor 920 controls overall operations of the display system 900. For example, the host processor 920 may be implemented in the form of an application processor (AP) or a system-on-chip (SoC).

The display device 940 includes a display driving integrated circuit 950 and a display panel 960. The display device 940 and the display driving integrated circuit 950 may be the display device and the display driving integrated circuit according to example implementations described with reference to FIGS. 17 through 20B. The display driving integrated circuit 950 may include a command processing device CMD_PRC. The command processing device CMD_PRC may be the command processing device according to example implementations described with reference to FIGS. 1 through 16B. The command processing device CMD_PRC may generate the plurality of control signals CONT by processing the plurality of commands CMD based on the first processing scheme (e.g., hardware scheme) or the second processing scheme (e.g., software scheme) depending on the types of the commands CMD.

The host processor 920 and the display device 940 (e.g., the display driving integrated circuit 950) may communicate via the channel 910. For example, the channel 910 may be implemented based on the MIPI standard, the host processor 920 may operate as a MIPI transmitter, and the display driving integrated circuit 950 may operate as a MIPI receiver.

Figure 22:
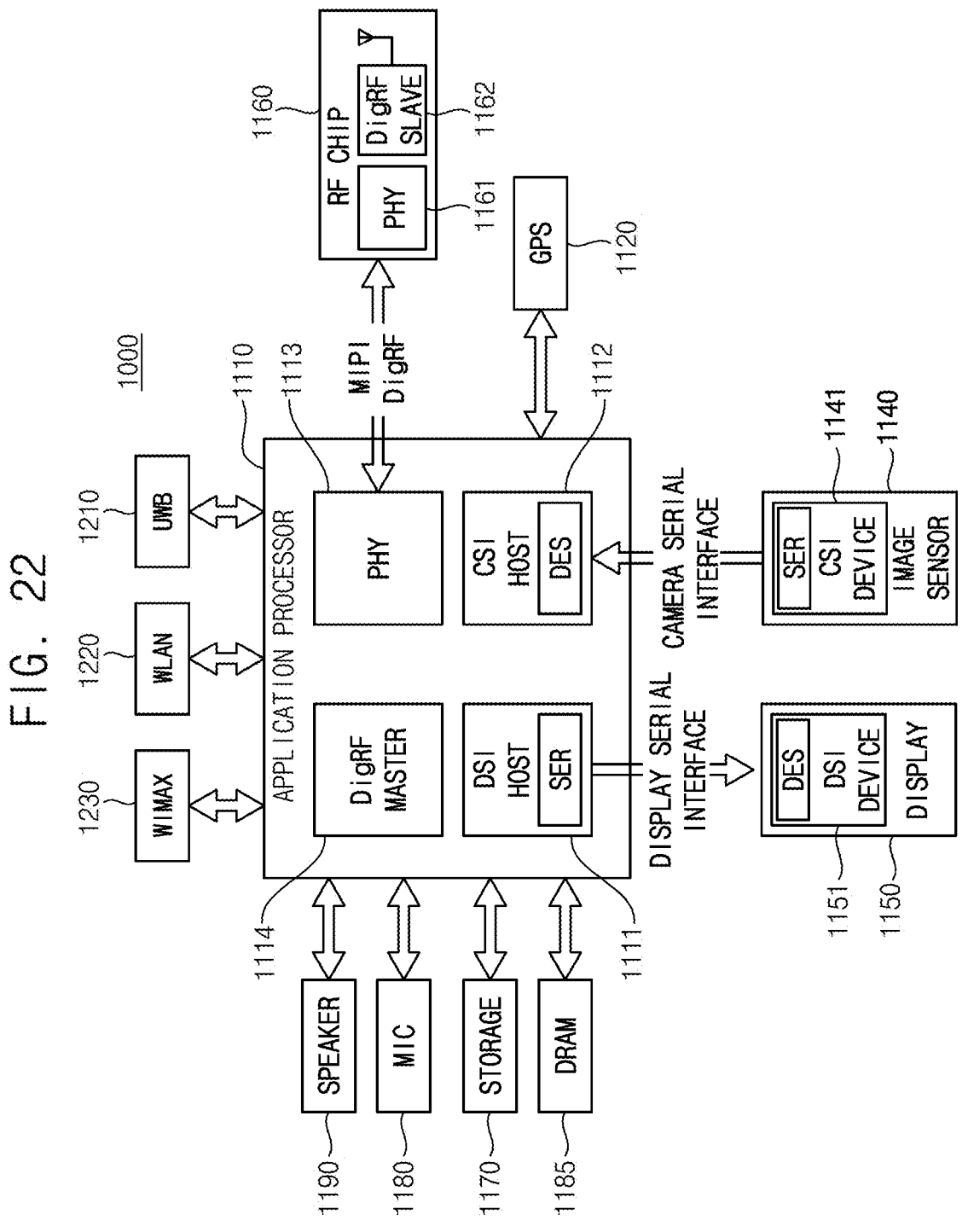
FIG. 22 is a block diagram illustrating an electronic system including a display system according to example implementations.

FIG. 22 is a block diagram illustrating an electronic system including a display system according to example implementations.

Referring to FIG. 22, an electronic system 1000 may be implemented as a data processing device that uses or supports a mobile industry processor interface (MIPI). The electronic system 1000 may include an application processor 1110, an image sensor 1140, a display device 1150, etc. The electronic system 1000 may further include a radio frequency (RF) chip 1160, a global positioning system (GPS) 1120, a storage 1170, a microphone (MIC) 1180, a dynamic random access memory (DRAM) 1185 and a speaker 1190. In addition, the electronic system 1000 may perform communications using an ultra wideband (UWB) 1210, a wireless local area network (WLAN) 1220, a worldwide interoperability for microwave access (WIMAX) 1230, etc.

The application processor 1110 may be a controller or a processor that controls operations of the image sensor 1140 and the display device 1150.

The application processor 1110 may include a display serial interface (DSI) host 1111 that performs a serial communication with a DSI device 1151 of the display device 1150, a camera serial interface (CSI) host 1112 that performs a serial communication with a CSI device 1141 of the image sensor 1140, a physical layer (PHY) 1113 that performs data communications with a PHY 1161 of the RF chip 1160 based on a MIPI DigRF, and a DigRF MASTER 1114 that controls the data communications of the physical layer 1161. A DigRF SLAVE 1162 of the RF chip 1160 may be controlled through the DigRF MASTER 1114.

In some example implementations, the DSI host 1111 may include a serializer (SER), and the DSI device 1151 may include a deserializer (DES). In some example implementations, the CSI host 1112 may include a deserializer (DES), and the CSI device 1141 may include a serializer (SER).

The application processor 1110 may be the host processor according to example implementations, the DSI device 1151 may be the display driving integrated circuit according to example implementations, and the application processor 1110 and the DSI device 1151 may form the display system according to example implementations. The DSI device 1151 may include the command processing device according to example implementations.

The example implementations may be applied to various electronic devices and systems that include the display devices. For example, the example implementations may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

The foregoing is illustrative of example implementations and is not to be construed as limiting thereof. Although some example implementations have been described, those skilled in the art will readily appreciate that many modifications are possible in the example implementations without materially departing from the novel teachings and advantages of the example implementations. Accordingly, all such modifications are intended to be included within the scope of the example implementations as defined in the claims. Therefore, it is to be understood that the foregoing is illustrative of various example implementations and is not to be construed as limited to the specific example implementations disclosed, and that modifications to the disclosed example implementations, as well as other example implementations, are intended to be included within the scope of the appended claims.

What is claimed is:

1. A command processing device comprising:

an asynchronous first-in first-out (FIFO) circuit configured to receive a plurality of commands from an external device and to store the plurality of commands;

a mode configuration circuit configured to set a command processing scheme for each of the plurality of commands to one of a first processing scheme or a second processing scheme different from the first processing scheme, the mode configuration circuit being configured to store the command processing scheme for each of the plurality of commands; and a post processor configured to determine the command processing scheme for each of the plurality of commands based on a setting value sent by the mode configuration circuit, the post processor being configured to generate a plurality of control signals by processing the plurality of commands based on an input sequence of the plurality of commands and the determined command processing scheme.

2. The command processing device of claim 1, wherein the first processing scheme includes a command processing scheme that is fixed based on an internal structure of the post processor, and wherein the second processing scheme includes a command processing scheme that is configurable based on the internal structure of the post processor.

3. The command processing device of claim 1, wherein the plurality of commands include a plurality of command identifications (IDs), wherein the mode configuration circuit is configured to store a plurality of setting values for the plurality of command IDs, and wherein the command processing scheme for each of the plurality of commands is determined based on the plurality of command IDs and the plurality of setting values.

4. The command processing device of claim 1, wherein the post processor includes:

a controller configured to receive a first command from the asynchronous FIFO circuit, to receive a first setting value for the first command from the mode configuration circuit based on a first command ID included in the first command, and to determine a command processing scheme for the first command based on the first setting value;

a first processor configured to, based on the command processing scheme for the first command being determined to be the first processing scheme, generate a first control signal by processing the first command based on the first processing scheme; and a second processor configured to, based on the command processing scheme for the first command being determined to be the second processing scheme, generate the first control signal by processing the first command based on the second processing scheme.

5. The command processing device of claim 4, wherein the first processor includes a plurality of logic circuits, and wherein, based on the command processing scheme for the first command being determined to be the first processing scheme, a first transaction that is generated by processing the first command by the first processor is output as the first control signal.

6. The command processing device of claim 4, wherein the second processor includes program codes that are stored in a memory and executed by a microcontroller unit, and wherein, based on the command processing scheme for the first command being determined to be the second processing scheme, a first interrupt that is generated by processing the first command by the second processor is output as the first control signal.

7. The command processing device of claim 4, wherein the controller is configured to, based on the first setting value having a first value, determine the command processing scheme for the first command as the first processing scheme, and wherein the controller is configured to, based on the first setting value having a second value different from the first value, determine the command processing scheme for the first command as the second processing scheme.

8. The command processing device of claim 4, wherein the controller is configured to, based on the command processing scheme for the first command being determined to be the first processing scheme, determine an access scheme for the first command based on the first setting value.

9. The command processing device of claim 8, wherein the first processor is configured to, based on the access scheme for the first command being determined to be a first access scheme, generate the first control signal by processing the first command, and wherein the first processor and the second processor are configured to, based on the access scheme for the first command being determined to be a second access scheme different from the first access scheme, generate the first control signal by processing the first command.

10. The command processing device of claim 9, wherein, based on the access scheme for the first command being determined to be the second access scheme, both (i) a first transaction that is generated by processing the first command by the first processor and (ii) a first interrupt that is generated by processing the first command by the second processor are output as the first control signal.

11. The command processing device of claim 9, wherein the controller is configured to, based on a first access setting value included in the first setting value having a first value, determine the access scheme for the first command as the first access scheme, and wherein the controller is configured to, based on the first access setting value having a second value different from the first value, determine the access scheme for the first command as the second access scheme.

12. The command processing device of claim 4, wherein the controller is configured to check, based on the first setting value, whether the first command is valid.

13. The command processing device of claim 12, wherein, based on the controller checking that the first command is valid, the command processing scheme for the first command is determined and the first control signal is generated, and wherein the asynchronous FIFO circuit is configured to, based on the controller checking that the first command is invalid, be flushed to delete the first command, without determining the command processing scheme for the first command and without generating the first control signal.

14. The command processing device of claim 4, wherein the asynchronous FIFO circuit is configured to, based on the first control signal being generated, be updated to delete the first command.

15. The command processing device of claim 1, wherein the command processing device is configured to operate based on a mobile industry processor interface (MIPI) standard.

16. The command processing device of claim 15, wherein the plurality of commands include MIPI display command set (DCS) commands.

17. A display driving integrated circuit comprising:

a command processing device configured to generate a plurality of control signals based on a plurality of commands that are received from an external device; and a display driving device configured to drive a display panel based on the plurality of control signals, wherein the command processing device includes:

an asynchronous first-in first-out (FIFO) circuit configured to receive the plurality of commands from the external device, and to store the plurality of commands;

a mode configuration circuit configured to set a command processing scheme for each of the plurality of commands to one of a first processing scheme or a second processing scheme different from the first processing scheme, the mode configuration circuit configured to store the command processing scheme for each of the plurality of commands; and a post processor configured to determine the command processing scheme for each of the plurality of commands based on a setting value sent by the mode configuration circuit, the post processor configured to generate a plurality of control signals by processing the plurality of commands based on an input sequence of the plurality of commands and the determined command processing scheme.

18. The display driving integrated circuit of claim 17, wherein the display driving device includes:

an image processor configured to generate a data signal for displaying an image based on the plurality of control signals and a plurality of data.

19. The display driving integrated circuit of claim 18, wherein the display driving device further includes:

a data driver configured to generate a plurality of data voltages applied to a plurality of data lines of the display panel based on the plurality of control signals and the data signal; and a scan driver configured to generate a plurality of scan signals applied to a plurality of scan lines of the display panel based on the plurality of control signals.

20. A command processing device comprising:

an asynchronous first-in first-out (FIFO) circuit configured to receive a plurality of commands and a plurality of data from an external device and to separately store the plurality of commands and the plurality of data;

a mode configuration circuit configured to set a command processing scheme for each of the plurality of commands to one of a first processing scheme or a second processing scheme different from the first processing scheme, configured to set an access scheme for each of the plurality of commands to one of a first access scheme or a second access scheme different from the first access scheme, and configured to store a plurality of setting values each of which represents one of the first or the second processing schemes and one of the first or the second access schemes;

a controller configured to determine the command processing scheme for each of the plurality of commands and the access scheme for each of the plurality of commands based on a plurality of command identifications (IDs) included in the plurality of commands and the plurality of setting values, a first processor configured to, based on the command processing scheme for a first command being determined to be the first processing scheme, generate a first transaction by processing the first command among the plurality of commands based on the first processing scheme; and a second processor configured to, based on the command processing scheme for the first command being determined to be the second processing scheme, generate a first interrupt by processing the first command based on the second processing scheme, wherein, when the command processing scheme for the first command is determined to be the first processing scheme and an access scheme for the first command is determined to be the second access scheme, the first interrupt is additionally generated using the second processor, wherein the first processing scheme is a fixed command processing scheme that is performed depending on a structure of a plurality of logic circuits included in the first processor, and wherein the second processing scheme is a configurable command processing scheme that is performed by executing program codes stored in a memory by a microcontroller unit included in the second processor.

* * * * *